(12) United States Patent
Samid

(10) Patent No.: US 10,733,374 B1
(45) Date of Patent: Aug. 4, 2020

(54) LIVE DOCUMENTATION (LIDO)

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 16/725,897

(22) Filed: Dec. 23, 2019

Related U.S. Application Data

(63) Continuation-in-part of application No. 16/505,751, filed on Jul. 9, 2019, now Pat. No. 10,541,954.

(60) Provisional application No. 62/805,369, filed on Feb. 14, 2019, provisional application No. 62/813,281, filed on Mar. 4, 2019, provisional application No. 62/850,720, filed on May 21, 2019, provisional application No. 62/857,898, filed on Jun. 6, 2019, provisional application No. 62/900,567, filed on Sep. 15, 2019, provisional application No. 62/926,560, filed on Oct. 27, 2019, provisional application No. 62/931,807, filed on Nov. 7, 2019.

(51) Int. Cl.
*G06F 40/197* (2020.01)
*G06F 40/166* (2020.01)

(52) U.S. Cl.
CPC .......... *G06F 40/197* (2020.01); *G06F 40/166* (2020.01)

(58) Field of Classification Search
CPC .............................. G06F 40/197; G06F 40/166
See application file for complete search history.

(56) References Cited

U.S. PATENT DOCUMENTS

| | | | | |
|---|---|---|---|---|
| 8,606,021 B2* | 12/2013 | Conwell | ................ | G06K 9/228 382/224 |
| 9,262,390 B2* | 2/2016 | Edala | ...................... | G06F 16/35 |
| 10,318,543 B1* | 6/2019 | Sharifi | .................. | G06F 40/134 |
| 2003/0120593 A1* | 6/2003 | Bansal | .................. | G06Q 20/10 705/39 |
| 2005/0240393 A1* | 10/2005 | Glosson | ................ | G06F 40/166 704/8 |
| 2008/0027933 A1* | 1/2008 | Hussam | ................ | G06F 16/904 |
| 2009/0254572 A1* | 10/2009 | Redlich | .................. | G06Q 10/06 |
| 2011/0029491 A1* | 2/2011 | Joshi | ..................... | G06F 16/334 707/692 |
| 2012/0060082 A1* | 3/2012 | Edala | ...................... | G06F 16/907 715/231 |
| 2012/0143923 A1* | 6/2012 | Whitney | ............... | G06F 16/907 707/803 |
| 2012/0331088 A1* | 12/2012 | O'Hare | ............... | G06F 21/6227 709/214 |
| 2013/0063613 A1* | 3/2013 | Conwell | ................ | G06K 9/228 348/207.99 |
| 2013/0246077 A1* | 9/2013 | Riedmiller | ............ | G10L 19/008 704/500 |

(Continued)

OTHER PUBLICATIONS

Search Query Report from IP.com (performed Mar. 26, 2020).*

*Primary Examiner* — Sharon S Lynch

(57) ABSTRACT

A method for implementing Live Documentation (LiDo) systems to incorporate and authenticate metadata of electronic documents. An electronic document received at a first LiDo system is partitioned into textual units. Each textual unit has a payload with a printable message and metadata that is not visible to the consumer, wherein the metadata includes one or more attributes. A second LiDo system uses the one or more attributes of a textual unit to authenticate the writer of the textual unit and filter textual units to display only printable messages with a validity above a designated threshold.

5 Claims, 3 Drawing Sheets

LiDo Elements and Sequence

(56) References Cited

U.S. PATENT DOCUMENTS

| | | | |
|---|---|---|---|
| 2015/0100578 A1* | 4/2015 | Rosen | G06F 19/3418 |
| | | | 707/737 |
| 2016/0132479 A1* | 5/2016 | Edala | G06F 40/171 |
| | | | 715/230 |
| 2016/0366221 A1* | 12/2016 | Palmeri | H04L 63/0807 |
| 2017/0063551 A1* | 3/2017 | Quinn | G06F 21/645 |
| 2017/0346851 A1* | 11/2017 | Drake | H04L 63/0853 |
| 2019/0045207 A1* | 2/2019 | Chen | G06F 21/45 |
| 2019/0174099 A1* | 6/2019 | Hodge | G06K 19/06009 |
| 2019/0279101 A1* | 9/2019 | Habti | G06F 16/84 |
| 2019/0319808 A1* | 10/2019 | Fallah | H04L 67/1044 |

* cited by examiner

Live Documentation (LiDo)

Drawings

One Dimensional LiDo Document

Two Dimensional LiDo Document

LiDo Translation

LiDo Elements and Sequence

LiDo Retrace

LIVE DOCUMENTATION (LIDO)

CROSS REFERENCE TO RELATED APPLICATIONS

This application claims as priority date of:
Provisional Application 62/805,369 filed on Feb. 14, 2019
Provisional Application 62/813,281 filed on Mar. 4, 2019
Provisional Application 62/850,720 filed on May 21, 2019
Provisional Application 62/857,898 filed on Jun. 6, 2019
Provisional Application 62/900,567 filed on Sep. 15, 2019
Provisional Application 62/926,560 filed on Oct. 27, 2019
Provisional Application 62/931,807 filed on Nov. 7, 2019

STATEMENT REGARDING FEDERALLY SPONSORED RESEARCH OR DEVELOPMENT

Not Applicable

REFERENCE TO SEQUENCE LISTING, A TABLE, or A COMPUTER PROGRAM LISTING COMPACT DISK APPENDIX

Not Applicable

BACKGROUND OF THE INVENTION

Text generation is very dynamic, very cooperative and very reflective of human complexity, order and chaos. It is desirable to have a robust way to capture all that goes around a combination of words that assemble to become a document. Who wrote which parts, when, with what validity, as well as any other attributes.

BRIEF SUMMARY OF THE INVENTION

This invention describes a method for implementing Live Documentation (LiDo) systems to incorporate and authenticate metadata of electronic documents. An electronic document received at a first LiDo system is partitioned into textual units. Each textual unit has a payload with a printable message and metadata that is not visible to the consumer, wherein the metadata includes one or more attributes. A second LiDo system uses the one or more attributes of a textual unit to authenticate the writer of the textual unit and filter textual units to display only printable messages with a validity above a designated threshold.

DETAILED DESCRIPTION OF THE INVENTION

Figure 1:
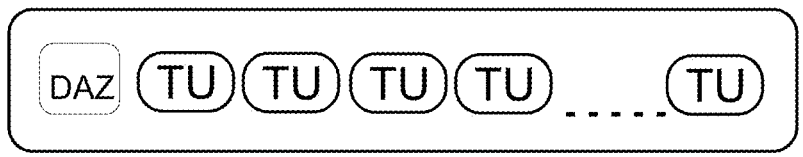
FIG. 1: One Dimensional LiDo Document
The figure shows the schematic structure of a LiDo document: it has a document administrative zone (DAZ) where document meta data is held, followed by any number of textual units.
Figure 2:
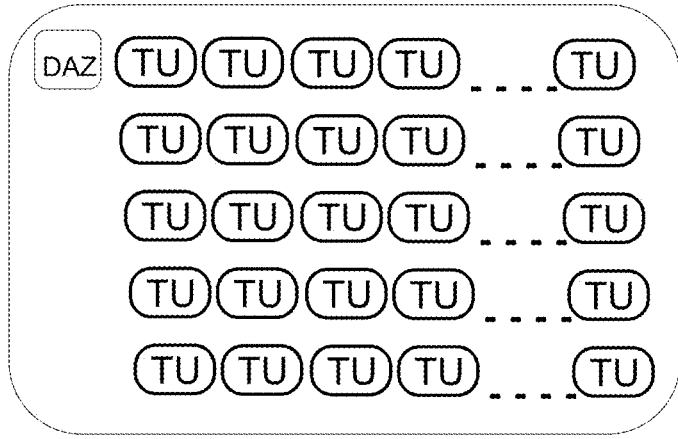
FIG. 2: Two Dimensional LiDo Document
This figure shows the schematics of a two dimensional LiDo document where a document administrative zone is followed by a matrix organized set of textual units.
Figure 3:
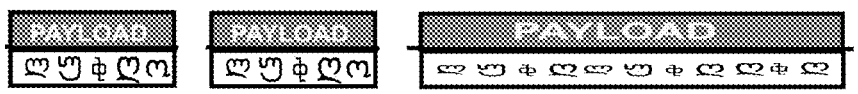
FIG. 3 LiDo Translation
The figure shows a succession of textual units where the payload features a translation of bit strings that express the same content in a foreign language.
Figure 3:
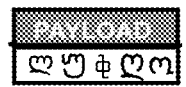
Figure 4:
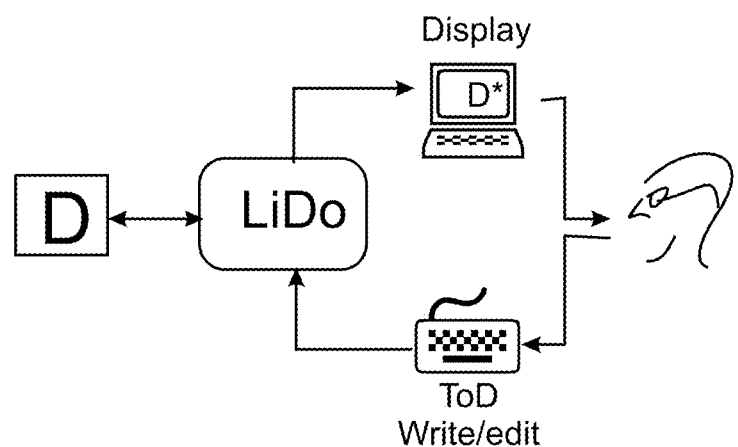
FIG. 4: LiDo Elements and Sequence
The figure shows the LiDo document D that is written and read by the LiDo software marked LiDo. The LiDo system connects with the writer/editor/reader of the document D who can write and send queries to LiDo and is served by a display of the payload, marked as requested.
Figure 5:
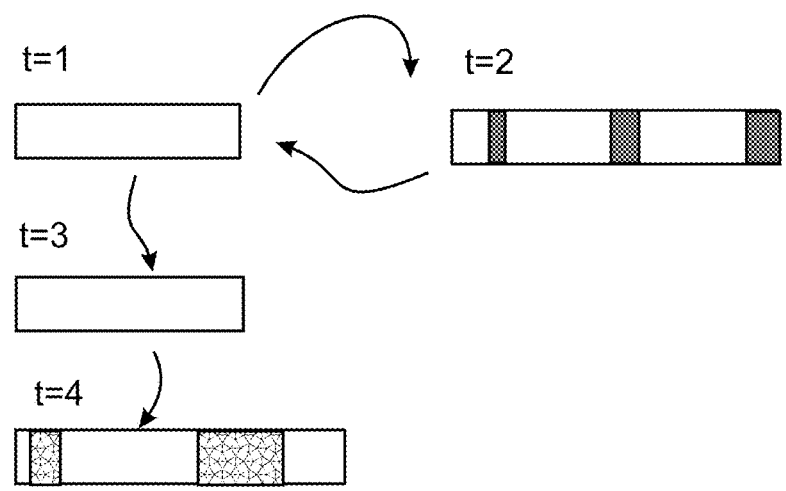
FIG. 5: LiDo Retrace
This figure shows the retrace option of LiDo. It shows a document at t=1 which evolved into a document at t=2. However the writer changed his mind, and wishes to retrace the development from t=1 to t=2. This is shown by the reverse arrow. The writer will then wish to take the document the way it looked at t=1 into a different direction. LiDo will then copy the document at t=1 to a new state, t=3 where the payload and the meta data is the same except for the time stamp. The document from t=3, then evolves into a state at t=4. The writer editor will be able to roll back the state of the document through time points 4, 3, 2 and 1.
Figure 6:
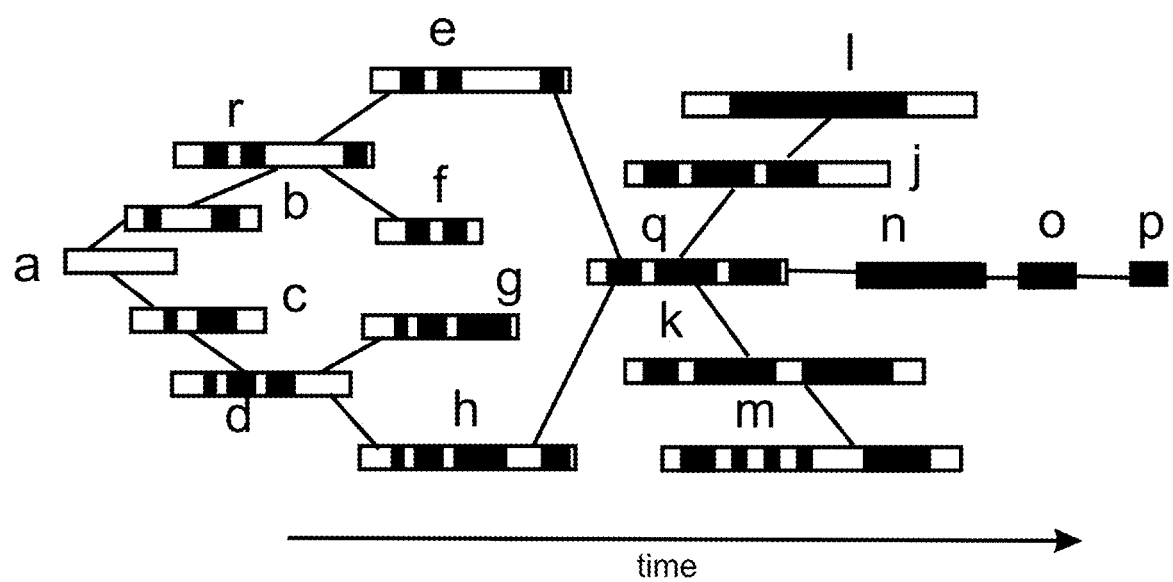
FIG. 6 Evolution of a Document Set
This figure shows a document at state a, gives birth to two documents b and c. document b gives birth to document r, and document c gives birth to document d. Document r then gives rise to documents e and f, and document d gives birth to documents g and h. The writers then decide to combine documents e and h into a new document q. q gives birth to document j and k. document j gives birth to document l. Document k gives birth to document m. Document q then gives rise to a summary document of itself, n. Document n is further summarized into document o, which is even further summarized into a shorter more encapsulated document p. Each of the shown documents may be a dead end or may give birth to more documents.

Text documents are the means by which people express themselves, work, cooperate, manage, direct, develop, project. Documents include statements, questions, answers, data that comes with a certain or questionable validity, is authored by a given individual, or organization, has a date of origin and perhaps a date of obsolescence, has a source, and has connections. Alas when this data is viewed as is, just the words, the statements, the paragraphs, the data, then all this accountability (validity, history, credit, links) is not present. Document handlers, like word processors, attach all sorts of meta data to specific documents in order to carry this accountability information. Alas, such accountability information is unique to a particular document handler and is not inherent in the document data itself. Presenting here a means to express documents such that the document data itself will carry the necessary accountability data. This is done using the methodology expressed in the continued patent application Ser. No. 16/505,751.

A good word processor will carry meta data along the main document text. Such meta data will characterize the document as a whole with attributes like time of creation, author. location etc. This is (i) a solution unique to the particular document handler in question, and (ii) it regards the document as a whole as the object described by the meta data. What will be more useful is to have a solution to this challenge where (i) the solution will be carried around with the document itself through an open protocol that will allow any document handler software to extract the benefit of the meta data, and where (ii) the attributes will be assigned at greater resolution—to parts, paragraphs, sentences, phrases, and words of the attributed document.

This presentation describes such a solution: documents are comprised of raw displayable data (the familiar document), and of meta data that is pin pointed to paragraphs, sentences, phrases, even to words. A consumer of the document will see it as usual with no disturbance from the reams of meta data accompanying the text. However, the document reader could specify terms of display (ToD), and the document handler will use the meta data (the attributes of the displayable data) to modify the display.

For example, the document reader may wish to see how this document looked like a few revision cycles earlier. By specifying the time point, the reader will be presented with the same document at an earlier version. Another example: the reader may wish to see the parts of a document that were taken from another document. These parts will be identified in the document.

For a group-written document, the reader may wish to differentiate among the various contributors, see what parts of the document were written by whom. The meta data will guide the LiDo document handling package to respond to this instruction.

Various statements within the document may have different levels of validity to them. A reader may wish to see only statement of a certain threshold validity and up (or to highlight the low validity parts of the document). The LiDo meta data will enable the document handling package to respond to this demand.

Some readers will wish that some particular offensive words will not be spelled out, the meta data will enable it.

Once the LiDo system is set in place, it will be able to serve a greater variety of demands and wishes, to better serve the document reader.

The Basic LiDo Concept

The central concept in the LiDo environment is the 'document'. Documents are collection of textual units organized in a multi-dimensional order. A textual unit is defined as a word (a collection of letters of a given alphabet that in a particular order is associated with a meaning), or as some set of ordered words (e.g. a phrase, a sentence, or a paragraph). The textual units fitting into an N dimensional order will be identified as $u_{ijk\ldots}$, with N subscripts each identifying the position of that textual unit in the order.

The LiDo document also includes a document administrative section. We shall focus primarily on a one dimensional document (D) comprised of a list of ordered n textual units: D: $u_1$ $u_2$ ... $u_n$ We will associate each textual unit with (i) a primary content, $u^p$, and (ii) a secondary, or meta content, $u^m$. The primary content will be the normal reading of the textual unit. So a textual unit 'dog' will have as its primary (or payload) message as 'dog'. The secondary, or meta content will be comprised of q attributes $A_1, A_2, \ldots A_q$, which characterize and relate to that textual unit. For example, the first attribute may be the time point that textual unit was added to the document, and a second attribute will identify the writer who put that textual unit in the document. So the textual unit 'dog' will have as meta data $A_1$=12/03/2019: 19:40, and $A_2$=3 where writer "3" will be identified by name in the document administrative section (or zone). The meta content will not be displayed, only the primary data. However it will be kept in the memory that feeds the display. So if a reader of the document wishes to see how the document looked like on 12/02/2019:12:45, that word 'Dog' will not be written, not shown. And if the reader will wish to have anything writer #3 added to the document highlighted then this word 'Dog' will be highlighted.

We define the payload of a document (D*, $D^p$) as the sequence of the textual units identified through their primary content only:

$$D^* = D^p = u^p_1 - u^p_2 - \ldots u^p_r$$

For example, let a document D be defined as follows:
Textual Unit 1: $u^p_1$ is George; $u^1_m$: {α, 10}
Textual Unit 2: $u^p_2$: ate; $u^m_2$: {α, 10}
Textual Unit 3: $u^p_3$: the; $u^m_3$: {α, 10}
Textual Unit 4: $u^p_4$: red; $u^m_4$: {β, 15}
Textual Unit 5: $u^p_5$: apple; $u^m_5$: {α, 15}
Textual Unit 6: $u^p_6$: today; $u^m_6$: {γ, 18} where the meta data is comprised of two parameters: identification of writer (in this example we have writers α, β, γ), and identification of time written (in this example identified as 10, 15, 18 in some time units).

The payload of D: D* or alternatively written as $D^p$ will be:

$$D^* = \text{'George ate the red apple today'}$$

while the full document, D, will contain both the payload and the meta data.

The idea of LiDo is the ability of the document reader to specify Terms of Display (ToD) to adjust the displayed payload according to terms related to the meta data of the document.

For example, the document reader may wish to see how the document looked at time point t=16. When the document handler scans the document it will omit every textual unit which was generated at a time point later than t=16. In the case above this will apply to text unit #6, so the displayed payload will be:

$$D^*(t=16) = \text{'George ate the red apple'}$$

Textual unit #6 remains as part of the document, but is omitted in the display to accommodate the terms of display (ToD) dictated by the reader.

The reader might also request that the display will underline all the contributions made to the document by writer β. The display will then be:

$$D^*(\text{underline writer } \beta) = \text{'George ate the \underline{red} apple today'}$$

A textual unit, as indicated may be any combination of words like in this case:
Textual Unit 1: $u^p_1$ is 'Albert Einstein'; $u^1_m$: {α, 10}
Textual Unit 2: $u^p_2$: said; $u^m_2$: {α, 10}
Textual Unit 3: $u^p_3$: "The mind is like a parachute . . . . It only works if we keep it open."; $u^m_3$: {α, 10, link} where the phrase "The mind is like a parachute . . . It only works if we keep it open." is regarded as one textual unit. This unit has a third attribute, a link to a source to substantiate the claim that Albert Einstein said it. The reader may, or may not request this link to be displayed.

We can write symbolically D*=D(ToD), namely the displayed payload of a document is processed from the full document, including the meta data, according to the terms of display.

Retrace

One quite common eventuality is when a document at time point t=2, D(t=2), is queried for the LiDo system to roll it back to its state at time point t=1, D(t=1). At time point t=3, the writer re-evaluates the document at the past moment D(t=1) and then the writer decides to continue working on the document from that state, wiping out the changes that occurred from t=1 to t=2. In other words the writer, or the group of writers, decides to undo the changes that occurred since t=1. In that case, the D(t=1) is revised to D(t=3), such that every textual unit which is live in D(t=1) is assigned as dead at D(t=3), and another textual unit of same payload is born with t=3 as time of birth. Every textual unit in D(t=2)

which is not yet born in D(t=1) is assigned as dead in D(t=3). The writer will continue to evolve the document from D(t=3) and on.

Following this LiDo procedure, the retraced branch of the document (the changes from t=1 to t=2) will be kept in memory as part of the LiDo document. The writer may add changes to D(t=3) and then at time point t=4 re-review D(t=4) and decide to re-visit the retraced branch. Operated as described the LiDo system will readily present the reader with document at D(t=2), so if the writer changes his mind and the re-traced (and erased) branch, returns to favor, then LiDo will be able to apply the just described procedure to the document at D(t=2), and cancel the development from t=3 to t=4. And of course the writer can change his re-tracing ideas as many times as desired, all the history will be LiDo preserved.

Document Capsule

A LiDo document is an ordered (uni-, or multidimensional set) of textual units, which are held in what is called a document capsule. The document capsule marks the boundary of a document, provides document-anchored meta data (as opposed to textual units meta data). In particular a document may have a document-ID, and an indication of the version of the LiDo software used to prepare it. In general the document meta data will not identify the machine it is worked on because the general idea of LiDo is to have the LiDo editing power migrate with the document itself from one machine to another. If a document is associated with parent documents or child documents, or perhaps sibling documents, such association may be marked in the document meta data.

Document Sets

Documents may be associated in various logical relationships, e.g. logical parent, logical child, summaries, straight extension, etc. A set of documents such that from each document in the set one could identify all the other documents in the set by consulting the various documents meta data zones where the pointers to other documents reside. Namely the chain of pointers will be exhaustive over the entire set of documents. Document sets may be passed around to various readers and editors and contributors, who may actually invoke to a screen only a small fraction of them. Yet, there is an advantage to having the full set because a need to explore the set may arise at any moment in the future. The alternative of a document full of hyper links runs the risk that certain links will become dead, moot or removed by the entity that posted them. By contrast, once the set was emailed, or otherwise conveyed to a reader, the data is there.

We will further describe this payload dynamics with particular cases: (i) two dimensional documents, (ii) time travel documents, (iii) translation, (iv) cryptographic applications, (v) footnotes, and (vi) thematic applications.

Two-Dimensional Documents

We consider a document that is comprised of a table that predicts average temperatures in six cities for the next six months. The document can be comprised from the table, the framework for the subject data, and the data itself. We write $t_{ij}$ to indicate the average temperature predicted for city i during month j (i=1, 2, 3, 4; j=1, 2, 3, 4, 5, 6). We focus on the subject data document, which is comprised of numbers (words) that are organized as a 2 dimensional table, where the cities are listed top to bottom and the months are listed left to right.

A reader may ask for a nominal display, and will see:
c/m . . . 1 . . . 2 . . . 3 . . . 4 . . . 5 . . . 6
city 1 65 70 72 76 80 82
city 2 44 49 55 62 ?? 68
city 3 28 34 41 45 48 51
city 4 70 73 79 83 90 93 c/m reads as city/month. City 2 on month 5 is without any estimate. These temperature data is in each case an estimate that is based on some measurements and weather theory. These are predictions and as such they each come with a metric of trustworthiness. This metric is scaled from 0—completely untrustworthy to 100 fully trustworthy, and is featured as the meta data for these predictions. This trust indices are:
c/m 1 . . . 2 . . . 3 . . . 4 . . . 5 . . . 6
city 1 10 20 25 80 60 10
city 2 15 25 62 80 100 19
city 3 80 21 35 70 65 12
city 4 12 20 26 50 63 14

The reader might request to be shown only the values with validity of 60 or higher. The document handling software will then display:
c/m 1 . . . 2 . . . 3 . . . 4 . . . 5 . . . 6
city 1 ?? ?? ?? 76 80 ??
city 2 ?? ?? 55 62 ?? 68
city 3 28 ?? ?? 45 48 ??
city 4 ?? ?? ?? ?? 90 ??

And if the reader will wish to see the table with values above validity metrics of 20, then she will see.
c/m 1 . . . 2 . . . 3 . . . 4 . . . 5 . . . 6
city 1 ?? 70 72 76 80 ??
city 2 ?? 49 55 62 ?? ??
city 3 28 34 41 45 48 51
city 4 ?? 73 79 83 90 ??

Since the meta data goes with the payload data, a data viewer can readily change her Terms of Display, and switch among different views of the data, based on validity criteria. And because this data goes with the document, and is an open protocol, it is possible for every word processor, every web page to display it properly.

Time Travel Documents

Every textual unit may be associated with time of creation and time of deletion. Thereby a viewer will be able to travel back in time and study the evolution of a given document.

Consider a document that begins with:
D*=Tom Likes Lucy
comprised of three textual units with three attributes: the writer identity, time of creation and time of deletion $u_1\{A, 10, 99\}$ $u_2\{A, 10, 99\}$ $u_3\{A, 10, 99\}$, where time point 99 represent the de-facto infinity. And A represents Alice, the writer.

At time point t=12, Bob edits the document and replaces 'likes' with 'loves'. Now the document is comprised of four textual units:
$u_1$: 'Tom' $\{A, 10, 99\}$
$u_2$: 'likes' $\{A, 10, 12\}$
$u_4$: 'loves' $\{B, 12, 99\}$
$u_3$: Lucy $\{A, 10, 99\}$ and the current display of the payload is:

$$D^*=\text{'Tom loves Lucy'}$$

Note that the older verb 'likes' is still in the document but is dead as of time point t=12. And because it is dead, it is not displayed.

Now comes Carla and introduces her edit to look:
D='Tom makes love to Lucy'
It reflects in the document data as:
$u_1$: 'Tom' $\{A, 10, 99\}$
$u_2$: 'likes' $\{A, 10, 12\}$
$u_4$: 'loves' $\{B, 12, 15\}$ $u_5$: 'makes' {C, 15, 99}
$u_6$: 'love' {C, 15, 99}
$u_7$ 'to' {C, 15, 99}
$u_3$: Lucy {A, 10, 99}

The document data will now hold the full evolutionary history of the document. The reader will be able to roll back in time, and ask to see how the document looked at any past point. At time point 14, for example, the textual units introduced by Carla would not be shown because they were added at time point 15, and the textual unit 'loves' introduced by Bob will be alive because it died later, at time point 15.

Cryptographic Usage

We discuss: (i) statement signing, (ii) cryptographic setup, and (iii) equivocation encryption LiDo Statement Signing A document writer may use his private key to sign the primary message of his statement, and associate this signature as meta data. Any reader of this statement will be able to apply the writer public key to verify through the meta data (the signature) that the author of the data is the writer who is in possession of the corresponding private key of the published public key. This will eliminate false flags, false claims, false re-tweeting and false propagating of statements as if a certain person authored them.

This meta data authentication of text will be attached to the text given the LiDo format, through any rounds of quoting or re-citing. The practice of modifying quotes will be eliminated by all who use this protocol.

Platforms like Twitter and Medium, will be able to offer a writer this service. The platform will select a pair of private and public keys using RSA or elliptic curve cryptography or any other method of similar attributes, and automatically express the writing of the identified writer in the LiDo format where the payload is signed by the platform selected private key, and the released document is properly signed. The platform will maintain a public ledger of its writers' public keys. Any recipient of the document will be able to access the public ledger where the public keys are posted, and verify that the document was written by its claimed writer. The trust maintained by the platform will give trust to the posted public key. When a writer in such a format quotes from another writer, the platform will be able to conduct a check of authenticity.

As described different platforms will be able to select different pairs of public and private keys. Alternatively a writer could select from some source a pair of keys, publish his own public key and feed the private key to the platform to be used by the platform when constructing the LiDo document of the writeup.

In particular email clients will use a choice of a pair of public and private keys, and mark every outgoing email by a particular writer as a LiDo format output with the signature of the payload attached per the writer's private key. The outgoing email client will also build a public ledger with its writers' public key. The recipient mail client will reach out to the public ledger, copy the writer's public key and authenticate the email as bona fide before displaying it to the designated recipient.

Email users will be able to list names of senders they wish to receive emails from, and have those emails displayed only if they are authenticated per their LiDo private key. New writers will have to request display rights from the email user.

Email recipients could insist on only receiving mail from senders whose public key is displayed by a platform that checks the bona fide of people. This will shield email users from abusers.

The common practice of Phishing could be much alleviated. Today schemers pretend to be banks and government agencies, sending formal looking emails designed to defraud their recipients. They could not, though, write a message where the meta data contains the bank's signature of the payload (the visible message). The mail client, failing to verify the signed fraud email as signed by the bank, will not forward the fraud email to the intended recipient.

There is a common practice for writers to quote and re quote numeric results from surveys and experiments. Often some of such numbers are 'played with'. Using this LiDo signature method such numbers will be verifiable through the many rounds of their recitation and re-quotation.

On the other hand the LiDo meta data signature will be a non-repudiation instrument, against a writer denying his writing.

The signed LiDo document can also contain any other meta data parameters, not just the signature.

LiDo Cryptographic Setup

A given document may be put together for reading by several readers, where each reader is assigned by the writer to read some parts and no other parts of the very same document.

Let a document D contain t consecutive messages. Each message is regarded as a textual unit, so we write: $D = u_1 - u_2 - \ldots u_t$. Let us choose to encrypt each message with a distinct key. So $u_i$ (i=1, 2, ... t) is encrypted to vi using key $k_i$. $v_i$ then becomes the primary message (the payload), and the meta data indicates the value i, to state that this message is encrypted using key $k_i$. Any reader of document D in possession of $k_i$ will be able to decrypt $v_i$ to $u_i$. Any reader with no possession of $k_i$ will be unable to convert $v_i$ to $u_i$.

In summary then, document D will be interpreted to t distinct messages interpreted through t distinct keys. Some readers may have no key and be unable to read any message. Some readers may be in possession of all t keys and read all the t messages. And other readers will have one or more keys and interpret D accordingly.

This method can be applied hierarchally: top privilege readers are in possession of all t keys, less privileged are in possession of (t−1), keys, then a third group is only in possession of (t−2) keys, etc. A single document then will contain information with different degree of privilege.

This method can be used to negate or modify the meanings of implications of one part of the document.

Illustration: Let a document D be written as:
George is a Fair Employee—he is Quite Weak, we Plan to Let him go.

D will be divided to two textual units: $u_1$='George is a fair employee', and $u_2$='he is quite weak, we plan to let him go.' $u_1$ is encrypted with key $k_1$, which we choose in this illustration to be the integer 21, using the full transposition cipher Equivoe-T described in U.S. patent application Ser. No. 14/714,328. $u_2$ is encrypted with key $k_2$ which is the integer 105, using the same cipher as above. In both cases with no ghosts.

The results are $v_1$=1~a~afrpegiee~re~Gesmoiyo and $v_2$=k~~hleeq~tw~~aimt~.winlh~ieoue~~op~,-getsa. The output encrypted document:
$D^e$=1~a~afrpegiee~re~Gesmoiyo k~~hleeq~t-w~~aimt~.winlh~~ieoue~~op~,-getsa.

Non managerial personal will have only $k_1$=21 and interpret $D^e$ as "George is a fair employee", but managers who also hold key $k_2$=105 will read: "George is a fair employee—he is quite weak, we plan to let him go."

Equivocation Encryption

A document D generated at time t=0, D(0) may be edited at time t=1, to be D(1), then edited again at time point t=2, to be D(2), and so on D(3), D(4), . . . D(i).

The editing can be done such that the meaning of the various edits will be mutually inconsistent. The editor of D could hide the "right message" (the intended message) to be the one expressed in edit D(k), which is quite different from all other edited versions. Sending D out, the writer and editor of D will communicate to his intended reader that version D(k) is the one to regard, and all other versions are decoy and disinformation. The communication of the value of k will be through a different channel. All other readers of D will naturally regard the last version D(last) as the one to regard. This amounts to obfuscation, Hiding a message in a sea of disinformation.

For example:
D(t=1)='Alice danced while Bob was playing the guitar'
D(t=2)='Alice bribed Bob while he was playing the guitar
D(t=3)='Alice kissed Bob while he played the guitar'
D(t=4)='Alice sang while Bob was playing the guitar'

The normal display is the last one D(t=4). But the writer could have communicated to the intended reader to roll back the document to D(t=2) to read the true message. Other readers rolling back the document will have no guide as to which one is the true message.

Footnotes

The LiDo system can be used to allow for writers and editors to document their motivation for writing or editing action. Every written or deleted textual unit may have a pointer that will direct the reader to a note of explanation to justify this action, or to any related information. This so called footnote will be written in the document meta data zone. The footnotes will be numbered, and the number will appear in the textual unit meta data. Dead textual units may have footnotes explaining why they were killed.

Translation

The textual unit of a document may be selected per translation units from a different language. When words are translated these words will be set as textual units; when phrases are translated then these phrases will be set as textual units, and the same for full sentences and even paragraphs, if so required. No matter how different the visible signs of the letters of the translated language, its letters are carried out via bit strings, and hence can be written as meta data in a LiDo format.

By applying the translation option, a reader of the translation who is versed in the two languages will be able to click on a LiDo word or phrase and see right away the corresponding letter or phrase in the translated language. This tie-in of the translated-from and the translated-to languages on a word and phrase resolution may be critical for legal documents. Especially documents which are legally signed. The signature will apply to both languages.

Thematic Application

The LiDo way can be used to support thematic development of documents. We discuss the following: (i) thematic split, (ii) thematic union, (iii) thematic hierarchy, (iv) thematic network.

Thematic Split

Developing a document, the writer will identify two or more distinct theme, each requiring its own development. In that case, any number of textual units may be collated into a package to be used in a newly formed (child) document that will evolve on its own, perhaps with different writers. If necessary the history of this new (child) document will be traceable through the history of the respective textual units in the parent document.

As the child document develops, so in parallel may the parent document, for different purpose perhaps.

This thematic split is iterative, and can continue indefinitely. The evolving thematic network may appear very much like a common hyper-linked page, but with one distinction. In the LiDo way all the text (parents and children) may be transmitted and delivered to the readers who then navigate through it, (even off line). This fact that the various split themes are all packed into a LiDo document format gives this format search and review options which are not so easy on hyper links.

As a manifold of split themes develops, some of these splits may eventually be joined into a new insightful synthesis. All this dynamics is traceable and explorable.

Illustration. A parent document may develop as a news report about a local storm, describing certain damage from the winds. The destruction in each damage site may be a 'thematic child', so can a profile of a recognized hero who rescued storm casualties.

Thematic Union

Two distinct documents may be deemed to be elements of a unified theme. In that case textual units from each of the related documents will be copied into a common child document. This may be important for example, if the two related documents have respective summaries of their content in their respective document. In that case only this summary may be copied to the common child document, from where the two issues will be developed as part of a uniting document. Alas, if desired one could peer back to the parent documents to examine how the summary was written to reflect the more detailed material which is only present in the parent document not the child document.

When two or more documents are combined (unionized) then the textual units are combined into the combined (child document), and this child document is assigned its unique id. In its document meta data section it points out to the id's of the parent documents. Similarly, the parent documents will identify the other parent(s) and the id of the child document. This mutual pointing will facilitate tracing of the history of the set of documents.

Thematic Hierarchy

A common way to write books or other large documents is to start with a synopsis and then branch out to topics and do so iteratively. This may be reflected through iterative document splits, leading to a tree structure (hierarchy). In a nominal hierarchy only the 'leaves' are developed (only the documents with no children), but this is not a requirement. Hierarchies may be balanced or imbalanced.

Leaves or any set of documents in a hierarchy may be joined into a set of parents giving birth to a child document.

The leaves in a hierarchy may be joined together to define a combined child document that might now split along different cuts, or it may be summarized into a respective summary document.

Hierarchy can be built through iterative splits as discussed above, but also through iterative condensation (summaries). A document D might include a pointer to its summary document $D^s$, which is shorter version of D, but consistent with D with respect to its overall message, such that what is included in D and not in $D^s$ is marginal relative to a well defined and specified view point.

Summary extension may also be iterative $D \rightarrow D^s \rightarrow D^{ss} \rightarrow$ . . . following Einstein's maxim: "Every thing should be summarized as much as possible but not more so". The hierarchy of summaries will allow a reader to request a very short summary of a very big topic, and if interested to hop to the next (less condensed) summary, read some more, then to the next larger summary and so on as long as the network of documents will point to. This freedom to decide how deeply to delve into a topic is critical for readers who are pressed to optimize their precious time and attention.

An upswing summary of a large document is a big challenge for a writer, but also of great potential benefit as it challenges the writer to recognize the essence in his or her work.

Oscillating Hierarchies

Let D be a document that undergoes iterative split culminating in n split documents $D_1, D_2, \ldots D_n$, which might each grow and evolve. One may then join (combine, unionize) these n distinct evolved documents to one large document D':

$$D'=D_1\text{-}D_2\text{-}\ldots\text{-}D_n$$

D' might then undergo m iterative summaries: $D' \to D'^s D \to D'^{ss} \ldots \to D'^{s \cdots s} = D'^m$ $D'^m$ may be of roughly the same size as D, but it is a product of first a series of splits, and then a series of condensation (summaries). These activities increase the insight into the subject matter, and give $D'^m$ an advantage over D. Nonetheless $D'^m$ may undergo a new series of iterative splitting defining a new hierarchy, which then can be joined into a large union of all the new 'leaves', and then one will exercise an upward hierarchy of summaries, and so one can oscillate between downward and upward hierarchies, all the time further thinking and evaluating the same subject matter, generating more and more insight.

Thematic Network

A document hierarchy as described above is a special case of a thematic network of documents. The general case include more loose relationships. Two documents $D_1$, and $D_2$ will be regarded as having a thematic association if there exists a third document $D^s_{12}$ which can be split to two documents $D'_1$ and $D'_2$, such that $D'_1$ can logically evolve to $D_1$ and $D'_2$ can logically evolve to $D_2$. This definition can obviously be extended to any number of n documents which thereby can be thematically linked.

This definition of linked documents (a network of documents) challenges one's imagination to find such a $D^s_{12}$ document to 'tie in' two apparently disparate documents. Such non-obvious connections are very important in research and development projects, in forensic work and in intelligence analysis.

The thematic association documents will all be cross-linked (through pointers in the documents meta zones) and together define a set of documents.

Advanced LiDo Concept

We discuss the following issues: (i) Poly-LiDo, and (ii) Validity Calculus, and (iii) LiDo Knowledge economy.

Poly-Lido

We consider a writer developing a document, D*. We now consider a LiDo system that takes in the writer's input and generates a full-fledged LiDo file from it ($D^* \to D_1$). When called for LiDo reads in $D_1$ and displays D* for the writer to continue his document development. This is the basic LiDo operation.

We now consider a second LiDo system that takes in the very same payload D* and captures it in a different LiDo system, yielding a different LiDo file $D_2$ ($D^* \to D_2$). This second LiDo system will present the same D* for the writer to continue his work. That writer will not be aware that he works on the output of LiDo 2 and not on the output of LiDo 1.

LiDo 1 and LiDo 2 may both work in parallel, tracking different meta data. For example the first LiDo may track timing while the second LiDo will track writers in case of group writing. In that way there may be different LiDo systems serving different tracking parameters.

Of course there may be three or more LiDo processors of the same payload. Depending on the need. The various LiDo files may differ in what they track (time stamps, encryption, writers, etc.) but they may also differ in the way they parcel the text to different textual units. With all these distinctions, the payload will be the same.

The writer may split a document to children documents, and each child document too may be LiDo processed in many parallel ways.

Validity Calculus

A document set tracking validity of statements and data may be subject for various validity calculus operations, including those using AI capabilities to extract meaning and evaluate consistency. Occurrence of two documents in a set with textual units in the form of phrases such that these phrases support each other, may increase the validity rating of both statements if they originate via different sources. Alas, if two documents in a set feature textual units in the form of statements or data that is inherently contradictory then both statements lose validity rating.

It is relatively easy to exercise when the two evaluated statements are using the same language or close to it, but this applies also in cases where one statement is general in nature and the other is specific in nature. For example $D_1$='It is very cold in Minnesota in the winter', and $D_2$='One February 1st the lowest temperature recorded in Minnesota was −8 degree Fahrenheit'. The two phrases will be rated in higher validity since they validate each other, although the scope is different.

TU Online Trade: A New Knowledge Economy

Individual Textual Units (TU) may be offered for sale. This is enabled via a micro-transaction regimen like the one offered by BitMint (based on U.S. Pat. No. 8,229,859). As the textual units flow from the source to the consumer (the reader) the money paid for them flows in the opposite direction. Because BitMint money flows fast with no requirement for peer to peer approval and with a-priori authorization or authentication, such flow and counter flow may readily happen. By paying per TU the reader pays little to start reading the document, and only when he likes what he reads does he order more. The reader will stop at any moment. Because of the high resolution: pay per textual unit, the price per TU will be very small, allowing everyone to 'taste' a document and order and pay for it as a whole only if attractive. Readers then could browse through hundreds of thousands of books, as if they visited a library, and pay per the exact amount of reading. Every writer will have its own pricing, but it will become a dynamic market place. This will regard regular books, fiction or non fiction, text book, news report, books of science and technology, professional publications. The price per TU is so small that anyone would try something. No longer, buying a book, then realizing that after 10 pages, it is of no interest.

Textual units express information, knowledge, wisdom, the one benefitting will be fairly asked to pay for his or her advantage. By not releasing his wisdom and knowledge for free, the author of the words builds an incentive for himself or herself to be better at that, to express more valuable statements, to be more helpful to society. This is the standard capitalistic mechanism, here working at micro level, fraction of a cent perhaps per word. Anyone who knows something of value to someone else, or who has realized a peace of wisdom beneficial for someone online, will be motivated to offer his words for sale at the high resolution of a textual unit.

TU Trade Applications

Discussing (i) dedicated advice, (ii) online library, (iii) popular innovation

Dedicated Advice

Many rising problems in daily life may be resolved by 'Googling' them, and fishing an answer from a variety of sources. Alas, in order to build a stronger bond between people in need of a solution and people wielding that solution, one can opt for the engine of capitalism—rewarding the solution giver. Using the LiDo format, solution givers could send their advice encrypted, and release it for consumption TU by TU, being paid little for each TU, to make the decision to pay that much easier.

This knowledge trade will lead to message essentialising gradient. A solution giver will describe his solution in full as $S_0$, then summarize it to shorter text $S_{n-1}$, then smaller: $S_{n-2}$, until $S_0$. If the solution giver has reputation he can offer $S_0$ for sale, otherwise $S_0$ will be offered for free. and charging will start from $S_1$, $S_2$, etc with different price per TU perhaps.

Helpful solution givers may eventually be registered in an organization that keeps score of how helpful one was. Unleashing market forces will result in greater efficiency in solving problems, and in exploitation of a lot of wisdom and knowledge distributed in minds and brains of people who are free to offer their knowledge because they are retired, bed ridden, limited for other reasons—even in prison! Offer wisdom that otherwise would have remained untapped. Here operationally the payment is so smooth that the practice will flourish.

Online Library

Today knowledge store libraries charge per book, per article, or otherwise per a large chunk of knowledge. Often time they charge for subscription. This is low resolution and prevents many would be customers from becoming any. Online trade at the TU resolution will allow consumers to pay for what they use, and not a word more. Since entry fee is so minimal, everyone virtually, will start reading.

This solution applies to books, magazines, and daily newspapers. The annoying advertising noise will be cleared. People will pay for what they use. This will also help privacy because BitMint payment can be done anonymously. The newspaper will be paid for its stories, and would care not who is reading and paying.

Popular Innovation

Innovation credit today is administered via the patent office where the smallest unit of credit is a U.S. patent application—an expensive bar. Ordinary people coming up with innovative ideas often abandon them because of the necessary effort to build up an innovative idea into a patent application. It is hard to estimate how much raw innovation is lost because of that high bar. Here is a LiDo based solution to this loss.

An Innovation Public Ledger (IPL) would be established, inviting members of the public to register and receive a pair of public and private keys. Registrants, using LiDo will be able to document any innovative idea they may have, and send it to the IPL for posting. The IPL will become thereby a repository of purported innovation ideas. A future patent applicant may take one or few IPL postings, negotiate an exploitation agreement with the posters of the used postings, and then prepare a patent application for countries of choice, and file the same. Any benefits emanating from that patent will be shared with the posters of the postings that take part in the application.

This popular innovation movement will unleash the creative power of the public which today is left out because of the high bar of patent applications.

For this basic idea to work well it is important to use the LiDo technology whereby any statement (payload) expressed by the innovator will be cryptographically signed per its content and its time stamp. The innovator will use his secret private key, and the IPL administration will post his or her public key so that anyone reading the posting will be assured of who and when was it posted.

The IPL will employee AI tools to sift through the posting and sort them out by fields and categories, to facilitate easy search.

Every innovator will naturally search the IPL posting because failing to locate prior art will send the innovator on a non productive path. The patent office will surely scan the IPL posting in search of prior art.

The postings might by decision stay live for a set period of time, after that the idea becomes public domain. This will prevent good ideas from being locked out.

Common Interest Clubs

People who share a topical interest are naturally organized in clubs or assemblies where knowledge, advice, and wisdom is being exchanged. Such organizations could facilitate trade of exchanged material (advice, etc). They could use the Transaction Tracker solution where the management of the club keeps track of the BitMint money traded between members, and facilitates a quick and efficient money exchange. Such clubs may be small, but also may be very large and global where members only know each other online.

TU Trade Operational Discussion

There is a need to facilitate fast payment of tiny amounts of money. The payment is per textual unit, in a very small amount that must be paid without delay. This can be done by allowing the TUs to flow to the consumer while in parallel draining the BitMint digital coin from which the consumer pays for the TUs. Before the TU start streaming, the TU provider validates the identity of the coin from where the consumer will drain its pay, and then the payment bits are accumulated by the provider, first in the consumer's computer, then passed to the provider to redeem.

Alternatively the TUs are pre communicated by encrypted, and the per TU cryptographic key is passed in parallel to the consumer paying for it.

Implementation of Lido

We address now the question of how to implement the idea of associating a primary message with a meta message. The discussed answer is to use the methodology detailed in patent application Ser. No. 16/505,751 Cyber Companion.

Using AB, a unary alphabet of size $2^t$, where t=1, 2, ... where letter i (i=1, 2, ... $2^t$) is written as a stretch of $2*(\beta+i)$ bits, comprised of pairs of bits which are either '01' or '10', and where $\beta$ is a choice non-negative integer, $\beta$=0, 1, 2, ....

For example for t=3 the AB alphabet will be comprised of $2^3$=8 letters: A, B, C, D, E, F, G, H. Let $\beta$=5 then letter A will be written $2*(5+1)$=12 bits comprised of 6 pairs of '01' or '10' combinations. Namely, some of the $2^6$ ways to write letter A will be:

A (letter in unary alphabet AB)=01 01 01 01 01 01
A (letter in unary alphabet AB)=10 10 10 10 10 10
A (letter in unary alphabet AB)=01 10 01 10 01 10

Letter B will be written with 2(5+2)=14 bits, comprised of 7 pairs of either '01' or '10'. Letter C will be written with 2(5+3)=16 bits, and so on, letter H will be written with 2*(5+8)=26 bits, or 13 pairs of either '01' or '10'.

Having defined the method to write the letters of the AB alphabet, we now define the method to combine letters to words (a string of letters of the AB alphabet). The method is: 11 [1st letter of the word] 00 [2nd letter of the word] 00 00 [last letter of the word] 11

For example, writing the word 'ABA' in the alphabet from the previous example, will be:
'ABA'=11 'A' 00 'B' 00 'A' 11=11 10 10 10 10 10 10 00 01 01 01 01 01 01 01 00 10 01 10 01 10 0111=11L 11 where L represents the letters of the word without the start and end markers ('11').

Words will be combined to textual units:
$U=W_1-W_2-\ldots W_s$=11 $L_1$ 1 -11 $L_2$ 11 - ... -11 $L_s$ 11
where $W_i$ (i=1, 2, ... s) represents letter i in the sequence of words that combine to a textual unit, U. $L_i$ represents the letters of word i, without the '11' header and trailer markers. A textual unit then is a string of s words (s a positive integer). Textual Units will be written as follows:

$$U=1111\ L_1\ 11\ L_2\ 11\ \ldots\ 11\ L_s\ 1111$$

Namely when two words are strung together into a textual unit they drop one marker:
$W_i-W_{i+1}$=11 $L_i$ 11-11 $L_{i+1}$ 11=11 $L_i$ 11 $L_{i+1}$ 11
for i=1 to i=s-1.

A textual unit U can be written as U=1111 Ω 1111, namely Ω represents the words of the textual unit without the header and trailer markers ('1111').

Textual units ($U_1, U_2, \ldots U_d$) will be strung (sequenced) together into a document, D:
$D=U_1-U_2-U_d$ The stringing will be written as:
D=111111 M 111111 $Ω_1$ 1111 $Ω_2$1111 ... 1111 $Ω_d$ 111111 where $Ω_i$ is the string of words in textual unit i, and M represents document-anchored meta data. M is of open length written in any binary language as long as the pair '11' is not used. M can be written in binary using any two of the three combinations: 01, 10, 00, or it may use all three combinations.

We can write for short: D=M $U_1\ U_2\ \ldots\ U_d$

As defined above any document D can be processed to display for a reader the text that is written in this LiDo way, using the AB unary alphabet. This text will be regarded as the primary content of document D, or alternatively as the payload of document D. Any piece of software programmed to interpret D according to the alphabet AB will produce the same text to be displayed on a screen, printed out, or shown in any other way for human consumption: D→{D payload}.

We define the payload bit pairs as the pairs of the form '01' or '10'. The other bits in a document or in a textual unit, or in a word are regarded as meta bits.

The displayed text of a textual unit will similarly be called the primary message or content of the textual unit or the payload of the textual unit, same for a word written in the LiDo way.

Let $L_{ij}$ be letter j of word i in a given document D, comprised of ω words. Let $|L_{ij}|$ represent the number of bit-pairs in $L_{ij}$. Let $|L_{i0}|$ represent the number of payload bit-pairs in word i:

$|L_{i0}|=\Sigma|L_{ij}|$ ... for j=1,2, throughout the letters in word i.

Let a textual unit U, be comprised of ω words. Such unit will be comprised of η payload bit pairs where:

$η=\Sigma|L_{i0}|$ ... for i=1,2, ... ω

Since every payload bit pair may be written either as '01' or as '10' there are $2^η$ possible ways to express the payload captured in textual unit U. This implies that such a textual unit will be able to express a second message (different from the payload) by assigning the identities of the η bit-pairs in U. This second message will be regarded as the meta message of U.

In general the bit count for the secondary message is larger than the bit count for the primary message.

For example, we look at a unary alphabet AB for t=5. This alphabet is comprised of $2^5$=32 letters. Let's choose β=0. Accordingly these 32 letters are represented via bit strings of size 2 bits (one pair) to 64 bits (32 pairs). The average length of a letter of alphabet AB will be (1+32)/2=16.5 pairs, or 33 bits. The 32 letters of the AB alphabet are nominally represented by a 5 bits string each. These nominal letters are expressed in the AB unary alphabet through 33 bits on average. This computes to 33/5=6.6 times larger (in bit count) due to switching from 'normal' expression to unary expression. The corresponding meta data size is $2^{16}$=65,536 distinct strings per average letter, all sharing the same payload.

The average character size of a word in the English language is 5.5 characters. Each character is written usually through ASCII, using 1 byte=8 bits. So the average English word is 5.5*8=44 bits. Let's round to 45 bits, then the average English word will be written via 9 letters in a unary alphabet with t=5. It implies that the average English word will have 16*9=144 bit-pairs to be specified as either '01' or '10'. Or say there are $2^{144}$=2.23*$10^{43}$ distinct strings, all sharing the same word as their primary message. This is plenty of room to express a great deal of meta data associated with the average word in the English language.

The textual unit is the unit that would be described and related to by the meta data.

The question now arises, how to fit the meta data into identities of the bits used for the primary message. A related question arises over the document structure as a whole and over the operational environment
where LiDo is implemented.

Meta Data Setup

The LiDo user wishes to specify metadata to be associated with the primary message of a textual unit. The user will do so by attaching p independent properties (attributes) to each textual unit: $q_1, q_2, \ldots q_p$. each property $q_i$, (i=1, 2, ... p) will be planned to specify a value selected among $v_i$ possible values. Since the properties are independent the number of possible attribute attachments to any given textual unit will be: $v_1*v_2*v_p=πv_i$ for i=1, 2, ... p. This will require for the textual unit to feature f free pairs of bits with which to express the meta data, where f will fit into the following relationship:

$$πv_i \leq 2^f$$

rewritten as:

$$f \geq \log(πv_i)=\Sigma\log(v_i) \ldots i=1,2,\ldots p$$

Since LiDo will have to be operational for any size textual unit, one must account for the smallest size, which is one unary letter comprising a full textual unit (selecting β=0). The bit size of this textual unit might be the smallest possible: one pair (f=1), certainly not enough to house values of the p properties.

We discuss two different solutions to this bit size disparity: (i) the added base approach, a larger β value, and (ii) the added unprintable characters approach. These solutions can be implemented on an either or basis or on a combination basis.

The values of the p properties may be indexed, namely written as 1, 2, 3 . . . with the document meta data zone, interpreting each index to its real value. For examples, authors may be marked as 1, 2, 3, in the textual unit, while the document meta data zone will identify them as George Rosenberg, Alice Quency, and Ruth James.

One or more of the meta data attributes may be open-ended, namely the range of possible values to be assigned is not pre bound. An acute example is the time stamp. Documents may be edited and re-edited on and on, and each edit will need to be specified as to the time a textual unit was born and the time a textual unit was killed. Whatever the method chosen to represent time stamps, a finite size field may eventually be exhausted.

There are two reasonable ways to handle this challenge: (i) dynamic add-on of unprintable characters, and (ii) document generational sequence.

The Added Basis Meta Data Solution

In this approach the $2^t$ letters of the unary alphabet will be assigned a large enough β value where:

$$\beta \geq \log(\pi v_i) - 1 \ldots i=1,2,\ldots p$$

This will insure that even if the textual unit is comprised of a single unary letter (and the smallest at that), there will be enough room to house all the meta data planned. This requirement will be relaxed if the smallest considered size for a textual unit is k>1 units:

$$\beta \geq (1/k)^* \log(\pi v_i) - 1 \ldots i=1,2,\ldots p$$

Dynamic Adjustment of β

The value of β may be captured in the document meta data zone, and may be (i) unique per document, and (ii) dynamically adjusted, without any change to the payload, or to the interaction with the writers and editors of the document. If for any reason more meta data space is needed, then the document can re-write itself with a higher β value automatically set.

The Unprintable Character Meta Data Solution

Whether through ASCII or otherwise, not all bit-wise substrings correspond to a printable human readable letter. Any such sub-string of a non-printable letter can be added to a textual unit by padding it to its end, or to its start, or padding two or more such sub-strings if necessary. All such padding will not change the primary message of a textual unit (its payload) because the padded sub-strings are not printable. Yet, they will supply as many bits as needed for the meta data to be fully expressed.

This solution of unprintable characters has the advantage of allowing for dynamic application to take care of an overflowing field. Some attributes, like time stamps are open ended. A document may survive a long time and require a long span of time indicators, overflowing any finite size field allocated for it. Such overflow can be taken care of through sufficient add-on of unprintable characters which do not change the payload of the textual unit but does supply bits for specifying overflow data.

For t=2 a four letter alphabet is used: A, B, C, D. We may assign D to be unprintable, hence all the words, symbols and signs to be published will be constructed from strings of the letters A, B, and C. A word w may be defined as w=ABBACBC. If the desired meta data will need more room than the LiDo system provides then w can be written as w=ABBACBCD, or w=ABBACBCD . . . D, so that the printed message will remain the same: ABBACBC, but the added unprintable characters D will be stored in the document file.

Time Stamps

One potentially very desired attribute for meta data is a time stamp to specify when a textual unit was born (generated, penned) and when it was removed, 'killed'. In general a 'dead' textual unit cannot be revived. If need be a payload-identical textual unit should be born. This maintains the evolutionary history of the document. If a textual unit is a full phrase and an iota in the phrase (the payload) is changed, then the pre-change textual unit dies, and a new one including the slight change is being born. In other words a textual unit is defined over a fixed payload. Any change in the payload, kills it, and replaces it.

Documents may evolve over a lengthy period of time, so the field reserved for time of birth and time of death should be quite large. If a resolution of 1 second is desired, then to allow for at will time stamp over an entire year one should allow a field to accommodate: 60*60*24*365=31,536,000 entries, requiring f=25 bit pairs ($2^{25}$=33,554,432), and same number of bit pairs to stamp time of death, ringing a total of 50 bit pairs. Should one desire a 10 years life span for a document then 29 bit pairs will be needed ($2^{29}$=536,870, 912), or 58 bit pairs for both birth and death data. One could set the 'death time stamp' to be counted from the birth date, and so fewer bits will be needed to be reserved.

If the meta data is to include many more data elements, then 58 bit pairs may be regarded as too much. Alleviation solutions will be called for. An obvious one is to reduce the resolution from 1 sec to 10 seconds or to a minute. Another solution is to use better the document meta data.

We consider a document at rest. Its meta data identifies to as its time of creation and the start of its first development session. At time $t'_0$ the development (editing) concludes and the document is return to rest. Its development time is hence is $\Delta t_0 = t'_0 - t_0$. If $\Delta t_0$ is larger than say an hour, then the document will self-save and instantly start a new editing session marked as $t_1$. It will conclude at $t'_1$, and will last no more than an hour: $\Delta t_1 \leq 11$ hour. After one hour the document will self save and start a new editing session. This procedure opens up a span of time no longer than an hour in which a textual unit may be born or may be killed. 1 hour=3600 seconds, and can be captured with 12 bit pairs ($2^{12}$=4096), and hence 24 bit pairs will be needed to fix both time of birth and time of death. To this one will have to add bits to identify the time stamp reference for these 3600 seconds, as has been recorded in the document meta data zone.

Notice that the document meta data zone, is open, it can grow as much as needed and safekeep the start and end time of each editing session: $t_0-t'_0$, $t_1-t'_1$, $t_{s-1}-t'_{s-1}$, for s editing sessions. The absolute time of each edit will be computed from the seconds count since the reference time stamp.

It is possible to reduce the number of bits needed to execute time stamp, by marking the time stamps on the open-ended meta data zone for the document as a whole, and referencing these time stamps with a running count of numbers: 1, 2, . . . in the textual unit. Also, instead of identifying the exact second of the time stamp for the textual unit, it is possible to line up all the changes since a given document wide time stamp by order of occurrence: 1, 2, 3 . . .

Most documents though, have a short editorial period, so the reserved bits to track timing may be limited because documents where the allotted space for time stamping has been exceeded, may be handled either by adding more bits for meta data through adding unprintable characters to the textual units, or by killing that document and giving birth to a new fresh one where time stamping will start anew (the two documents will cross reference each other).

Encryption

The LiDo way of writing data makes it very attractive for fast and efficient encryption techniques. In particular unary alphabet, the way the payload is written can be processed through one round of complete transposition, as is described in Equivoe-T, application Ser. No. 14/714,328. Given that the need for secrecy is primary with the payload, not the meta data, such a transposition may expose to the cryptanalyst the total length of the letters that comprise the payload, say L bits. Every string of text comprised of q letters of lengths $l_1, l_2 \ldots l_q$, such that $L \geq l_i$ for i=1, 2, . . . q will be a viable candidate for the payload plaintext that encrypts (transposes) to the given transposed ciphertext. By randomly throwing in several 00 and 11 and doing so without introducing confusion, one could equalize the count of ones and zeros, and hence the length L itself will not be known by the cryptanalyst, only an upper limit thereto. Any textual unit could be padded with 1100 . . . 0011 which amounts to an "empty letter" namely a letter without a payload. This is an easy way to load the textual unit with at will number of zeros and ones to achieve balance or any other relative count of ones and zeroes.

Unlike transposition of normal text which does not have nearly the same measure of equivocation, transposition of the LiDo payload is inherently very equivocated. Every string of text with the sum length of its letters equal or less than the number of pairs of bits in the transposed (as well as the pre-transposed) bit sequence can be regarded as a bona fide candidate. The longer the textual unit that is so encrypted, the greater the equivocation. Note that by adding at will zeroes and ones (all of which gets transposed) the ciphertext increases its equivocation measure: there are more plaintext options that can encrypt (transpose) into the same ciphertext.

Equivoe-T type transposition is very fast and simple, even for large lists, and as shown above it offers robust security through rich equivocation (having a large number of plaintexts that would encrypt to the given ciphertext, given the right cryptographic key). This computation simplicity and its related aspect of being battery friendly, makes this LiDo transpo-encryption an option of great interest.

Using the same Equivoe-T transposition key for successive LiDo textual units will tend to erode the equivocation and hinge the encryption on intractability. This can be slowed down by successively encrypting textual units with a growing number of pairs of 00 and 11, so that the actual payload becomes an ever smaller section of the transposed list.

Illustration

Using t=3, the AB unary alphabet wields 8 letters: A, B, C, D, E, F, G, H, using β=0 these letters are represented by strings of pairs of bits of either '01' or '10' of lengths: 1, 2, 3, 4, 5, 6, 7, 8 respectively.

To write the word: 'DECA' as a textual unit, U, we write:
U=11 01 01 01 01 0010 1010 1010 0010 01 10 0010 11

Using Equivoe-T (patent application Ser. No. 14/714,328) with no ghosts and remover of value 8, the ciphertext, C, comes to:
C=10001100010100100010101101111011010010

Any string S, comprised of 17 "1" and 19 "0" as this one has an Equivoe-T key that would map it to C, so every such S is a candidate for the pre-transposition string, including:

U'=11 01 01 01 01 01 01 01 01 00 00 00 10 10 10 10 10 11

Alas, U' will be evaluated to:
U'=HE=11 01 01 01 01 01 01 01 01 00 00 00 10 10 10 10 10 11

Note that the separation between letter H and letter E is marked with three pairs of '00,' not one, in order to build a pre-transposition string of same number of ones and zeros. The cryptanalyst will not be able to determine if the word 'DECA' was transposed to C or the word 'HE'—or several other options where the sum of the length of the letters is 13, where for DECA we have L=4+5+3+1=13, and for 'RE' we have: L=8+5=13, or for 'GADA' where L=7+1+4+1=13, etc.

Note: this unary representation based equivocation is also effective over other ciphers.

Document Structure

The document expressed in the LiDo format was described as sequence of textual units, where each textual unit carries its primary data (its payload), and its meta data (the secondary message). The textual units are surrounded by two consecutive pairs of '11'. A textual unit U can be written as 1111Ω1111, where the Ω symbol represents the words that comprise the textual unit.

It is necessary to allow each logical unit to have space for its unit-wide meta data. As described each textual unit is associated with its own meta data, but there is no room for meta data attributing the document as a whole, as opposed to a particular textual unit thereto. We therefore assign a document start zone as an open area for document wide meta data. One way to identify it is by bounding the document with three adjacent pairs of '11' bits:
{LiDo Document:}=111111[open zone for document wide meta data]111111 $U_1 U_2 \ldots U_n$ 111111 where n is the number of textual units that comprise the document. Each document will feature three substrings of '11111' at its beginning, at the end of its document meta data zone, and at its very end. The open zone may feature some environmental identifiers: identification of the version of the LiDo software that generated it, the name of the originator of the document, his or her contact information or affiliation; the name of the project or initiative this document relates to, the name of the company or organization where this document is being developed; the time stamp of starting the document, any limitation on distribution, etc.

The bit pairs allowed in the open zone meta data are 01, 10, 00, but not '11' to avoid confusion with the end of the zone sign.

For various reasons it may be desired to blanket the deep past of a document, and keep 'live' only the more recent editorial changes. This can be accomplished via the Document Generational Sequence (DGS).

Document Generational Sequence

At any given moment one could copy the current status of a document in whole or in part into a freshly started document, and keep editing the copied data as if it was originally generated at the starting point of the new document: $D_o \rightarrow D_n$, where $D_o$ and $D_n$ are the old and new documents respectively.

This "birth giving" process (i) may apply to all the textual units in the old document, or to some of them, (ii) it may result in both documents proceeding with editing themselves independently, or it may be that the old document dies—freezes and is not subject to further changes. This "document birth giving" may happen with both meta data and payload being copied, or with only payload being copied.

The simplest birth giving operation is when only the payload is copied. This operation is the only birthing where the new document has the freedom to reparcel the text to a different pattern of textual units.

When a given old document, gives birth to a new document, the two may proceed with independent editing going forward. The only way to bring the two versions of the evolving document into a common ground is to first roll back each one to the point of departure, when the two were mirror image one of the other (from a payload point of view).

An old document, $D_o$ may give birth to any number k of off-spring new documents $D_{n1}, D_{n2}, \ldots D_{nk}$, which will from that point on continue with independent editing, including different writers etc. This will hold whether each of the k off-spring documents hold a different subset of the textual units of the old document, or whether there is partial or complete overlap.

In a nominal birth, the old document dies, and its entire content is passed to the new document. This will allow for a new team of document developers to work on editing the document.

Each new document may give birth to any number of its own off-springs. Say then that there may be an indefinite generational line spawning off a given document.

The document meta data zone will include a pointer both to a parent document, if any, and to all its children documents if any. Accordingly, given a single document in a 'family' it will be possible to recover and identify the entire family parents and children.

The exact procedure of giving birth may sustain a certain variety. In one way, all the dead textual units are passed ahead, in another way only the live textual units pass forward. One reason to giving birth is to shield historic stages of the evolution of a document from future developers.

The enterprise management will write rules whether to allow investigators of a child document to have access to the developmental history of the parent document or not.

Much as a parent document may give birth to several children documents, so for a child document, it may be constructed from textual units submitted by several parent documents. This variability allows for full fledge network of documents.

LiDo Environment

The LiDo environment is comprised of the LiDo system, the nominal document handling environment, and the document handlers (the human or AI writers and editors). LiDo can be used in a private mode, in restricted distribution, or in open-network mode.

The Components of the LiDo Environment

The LiDo environment is comprised of (i) the Lido System, (ii) nominal document handlers, and (iii) document writers and editors (human or artificial). The Lido system and the document editors and writers are necessary components. The nominal document handlers may, or may not be involved.

The Lido system is comprised of the LiDo-written document, and the LiDo software that operates on the LiDo Written document and handles the input from the writers and editors. The LiDo software also will be connectable to any of the large variety of common document handlers: word processors, editors, web pages, texting systems etc. The general operation is for the LiDo system to present to the writer/editor the payload of the LiDo document while keeping the LiDo Meta data well organized in the LiDo document, and then taking in all the editorial and composition action of the various writers and reflect this action faithfully in modifying the LiDo document. The LiDo software will allow the user to query the LiDo system with a variety of queries about the history and status of the document, like rolling it back in time, specifying validity, identifying writers, etc.

The LiDo System

The LiDo system is comprised of the LiDo software, and LiDo documents.

The LiDo documents are documents written in the LiDo way where payload (the nominal contents of documents) is associated with its meta data (the secondary content of LiDo written documents).

The LiDo software carries out the following operations: (i) it prepares and writes LiDo documents, (ii) it presents LiDo documents to document consumers (readers/writers/editors), (iii) it handles a display and input dialogue with the reader/writer/editor, and (iv) it interacts with various document handling systems.

In preparing LiDo documents the LiDo software interacts with document writers, takes from them input that the software then incorporates into the LiDo document, to be serving future consumers of the Lido document, such as queries and request for information regarding the document and its history.

In interacting with document handling system, the LiDo software fits into the prevailing environment.

The LiDo document language will be in the public domain. The document metadata is carried around with the document itself, so when a LiDO document is transmitted over a network, the information about further LiDo handling goes with it.

The default textual unit is a word, but the consumer may specify larger units like phrases and sentences.

Interaction LiDo and Nominal Document Handlers

The interaction between the LiDo system and any document handler, like an editor or a word processor may be very dynamic and intimate, but it may also be asynchronous and at session-resolution rather than at edit action resolution. In particular, let D be a LiDo document. At time point t=1, the LiDo software extracts it payload, D* and passes it to a document handler like a word processor, or it writes it in a file. Whichever way, the document handler (DH) takes D* in and presents it to a DH user who develops it further, adds new text, removes some old text, then saves the results, as D*'. The DH either communicates D*' to LiDo or it saves it at time point t=2, as a file, and LiDo subsequently reads it. The LiDo software will then process D*' in a basic way as follows: all the new words in the D*' that were not present in D* will be marked as born at time time t=2, and all the words in D* that vanished in D*' will be marked as killed at time point t=2. All these markings will be set in D(t=2). At any future time, t=3, LiDo will again prepare D*(t=3) and the process ahead will repeat itself. The accumulating D(t) will be able to support future queries as to how the document looked like at any time point in the past.

Illustration: D:

$u_1$: 'TOM' $\{t_b=1, t_d=99\}$
$u_2$: 'LOVES' $\{t_b=1, t_d=99\}$
$u_3$: 'LUCY' $\{t_b=1, t_d=99\}$ where $t_b$ and $t_d$ are time of birth and time of death respectively, and where $t_d=99$ is a substitute to infinity.

The corresponding D*='TOM LOVE LUCY'. A word processor take D* in where a writer, Fred, changes it to D*'="TOM REALLY LOVES NANCY" and saves it in a file time stamped LiDo now take D*' to prepare D(t=2):

$u_1$: 'TOM' $\{t_b=1, t_d=99\}$
$u_2$: 'REALLY' $\{t_b=2, t_d=99\}$
$u_2$: 'LOVES' $\{t_b=1, t_d=99\}$ $u_3$: 'LUCY' $\{t_b=1, t_d=2\}$
$u_3$: 'NANCY' $\{t_b=2, t_d=99\}$

When LiDo activates the document handler again at t=3, it sends the handler D*(t=3)="TOM REALLY LOVES NANCY"

With this design LiDo can be implemented gradually without requiring interference with the prevailing document handling operation.

Nominal Document Handlers

Modern life runs through documents, and cyber space offers a variety of document handlers: editors, word processors, web sites, message generating systems, etc. Nominally these document handlers (DH) take in a transmitted or saved file, display it for human consumption, edit it per human instructions, and then save the edited version. All the interactions of the DH with memory locations, or communication channels can be intercepted by LiDo. LiDo will save a file to be handled by a DH, and will take in to adjust the LiDo file saved by a DH.

LiDo Writers and Editors

LiDo will serve one or many writers and editors, human or artificial. Artificial writing is advancing fast. Grammar and syntax correctors are built in to many word processors. More advanced artificial writers will be asked to explain and expose the rationale of their actions through footnotes.

The writers and editors will be using a dialogue option with the LiDo software. The dialogue will allow them to impart to the LiDo system a variety of information to be captured in the LiDo files as meta data. Such are names of writers, level of validity of statement, encryption keys, etc.

LiDo Application Scope (Private, Restricted, or Open Network Mode)

LiDo may operate in a private personal mode where a single writer keeps track of her writing and editing, allowing her regularly to roll back the document to the way it looked earlier, and then brunch out in a different direction. The way LiDo works, the retracted brunch will remain in the LiDo document (D) available for history review display, should the writer change his mind again.

LiDo will keep track of a group collaborating on a document. Such cooperation can be synchronous, when LiDo operates on the cloud and the document editors have online access, or it may operate asynchronously when each editor has a copy of the LiDo software, and the most recent version of the document is passed around, perhaps through email or through document sharing software like Dropbox. The LiDo document holds all the information needed by the LiDo software to operate, so different editors may work with different embodiments of the LiDo software. If version management is properly done, then a group of editors will work well even if different editors use different LiDo versions.

When a restricted group edits a document they can use any method of encryption to pass the document around, but it must be saved unencyrpted for LiDo to operate properly.

Some documents are opened up for public editing. Case in point is Wikipedia, where an assigned editor will undo anything he or she does not like, and the removed material is lost. Using LiDo, Wikipedia will work the same with the difference that all the removed material will be recallable and reviewable. Will give more impartiality to the product.

Encapsulation

We describe here a method to divide a textual document D to successive textual units $U_1, U_2, \ldots U_n$, where a textual unit is a word, a phrase, a sentence, a paragraph, or several paragraphs, and such that each textual unit expresses a printable message (the payload), and associated meta data comprised of values of q attributes $A_1, A_2, \ldots A_q$, where attribute i (i=1, 2, ... q) has one of $v_i$ possible values; and where document D is associated with document meta data written in part of D where the document meta data zone is specified, and where the reader, or writer or editor, (referred to as 'the consumer') can forward Terms of Display (ToD) to the software package that processes D for human display (the LiDo package), to display or print D according to the values specified in the meta data for each textual unit, and where the writer and editor of D can input certain values of the attributes specified in the meta data per each textual unit, and the LiDo package writes those values into the textual units meta data.

The method above is farther refined, where the meta data for each textual unit in D includes a 'birth time attribute' and a 'death time attribute', written by the LiDo package, and where upon adding the textual unit to document D the time of this event is written as birth moment, and the time of death is written as 'undetermined', and if at some later time that textual unit is removed from D, then the time of removal is entered into the 'death time attribute' for that textual unit, and where upon display of D only live textual units are displayed, while all textual units, live and dead, are kept in D, and where the consumer asks the LiDo package to display D as it looked at any time from the birth of the first textual unit to the present; and this rule applies to current time, and to any past time specified by the consumer.

The method above is farther refined, where the meta data for a particular textual unit includes: (i) the identification of its writer, and (ii) the time of birth, and where the writer may sign the payload of a textual unit together with the writer information and the date of birth attributes of same textual unit, and then write this signature as another attribute within the meta data of that textual unit, and where a reader of same textual unit will retrieve the public key for the writer from a public ledger, and with it confirm that the payload of that textual unit was written by the identified writer at the specified time.

The method above is farther refined, where the payload of the textual unit is a translation from a foreign language, and the textual unit as written in the foreign language is written as a meta data attribute for that textual unit.

The method above is farther refined, where the validity of the statement expressed by the textual unit is specified by the writer and entered as a meta data attribute for that textual unit.

The method above is farther refined, where the payload of a textual unit is written via an alphabet AB comprised of $2^t$ letters, where t is a positive integer, and where letter i in AB, where i=1, 2, ... $2^t$ is written as $\beta+i$ pairs of bits, where $\beta$ is a non-negative integer, and the pairs of bits are either '01, or '10', and where the choice of pair identity does not impact the value of the written letter, i, and where the meta data for that textual unit is written via selection of a particular combination of bit pair identities, so that when the textual unit has m such bit pairs, there are $2^m$ possible such combinations with which to specify the meta data for the textual unit, and where between any two letters so written, there is a '00' pair of bits to mark where one letter ends and the other begins, and where each textual unit is bounded by a header and a trailer both in the form of bit pair '11', and where the document D begins with a string of '111111' followed by the administrative meta data zone, and where the meta data zone is terminated with a string '111111' followed by the sequence of textual units of the document, which are followed by a string '111111' which bounds the document.

The method above is farther refined, where knowledge that advances over the current art in a specified field of knowledge is written as payload of a textual unit, and is marked by a time stamp for time of creation, and by the identity of the author, and where the payload, the author identity, and the time stamp are signed by a private key of the author, and the combined payload and meta data is then posted on a public ledger which also displays the corresponding public key of the author, based on which the author negotiates for proper credit with anyone who later files a patent relying at least in part on the knowledge expressed in the posted message.

LiDo Technological Landscape

The LiDo concept is ingrained in a mesh of technological means to provide convenience, security, sustainability, and trade. These connected technologies are herewith described:
Extended Unary Alphabet (The Unary Mapping Function)

The nominal, regular unary alphabet expresses a $2^t$ letters (t=1, 2, ... ) through β+i pairs of bits of form '01' or '10', where i=1, 2, ... $2^t$. The extended unary alphabet will write letter i in the alphabet with f(i) pairs of bits (either '01' or '10). The function f may be any function that outputs a positive integer, and for which f(i)≠f(j) for all cases where i≠j. Function f will be called "The Unary Mapping Function".

Normally one would wish to write text in unary alphabet and use the smallest number of bit pairs, hence one would use f(i)=i, alas, there are situations where different f functions are desirables. One such situation is in the case of need to encrypt the message. The unary mapping function (UMF) may be used to introduce obfuscation and equivocation. The disparity between the mapped results may be large or small. The UMF may be part of the encryption key. The UMF may be dependent on a secondary parameter, r: f(i,r), where r is a random factor that is changed from one encrypted message to the other, or from one encryption session to the other. In fact the recipient may send r to the sender before each session or before each message, so the output of the UMF is changing each time it is used.

The UMF may be further extended by releasing the requirement for an integer output, holding on to the second requirement of no two equal outputs. In that case the $2^t$ letters will be ordered by their UMF result, and the order will determine their unary representation the way it is done in the basic mode.
Extended Use of Non Printable Characters By mapping a text to a unary alphabet with $q=2^t$ letters, and reserving 0<g<q−1 letters as non-printable letters, one increases the inherent equivocation of the ciphertext, using the Equivoe-TU cipher. These g nonprintable characters can be inserted anywhere in the text. That means that given an arbitrary message of sufficiently small size, there are more unary ways to write this message, so there is a better chance that one of those ways will be associated with an Equivoe-T key to match the message with a given ciphertext. The g non-printable characters may serve as a parallel message carried by the same ciphertext.

Equivoe-TU

Transposition of Unary Alphabet Written Text: Indefinite Terminal Equivocation

Vernam cipher is mathematically secure because it projects 'complete equivocation': every plaintext of size no larger than the ciphertext is a viable candidate for serving as the corresponding plaintext. Incomplete equivocation is a state where the number of plaintext candidates is smaller. Yet, that number may be large enough to confound the cryptanalyst with terminal equivocation, which cannot be resolved through further inferential processing of the ciphertext. Such is the Equivoe-TU. Regarding the plaintext as an arbitrary bit string, P, parceled out to successive groups of t bits, which can be fully represented through an alphabet comprised of $2^t$ letters. These $2^t$ letters are then represented in a unary fashion, namely, each letter i is represented by a bit string comprised of i+β pairs of bits (i=1, 2, ... $2^t$) where β is a non negative integer, and where each pair is either '01' or '10', however the bit identity of the pair is not a factor in determining the value of the represented letter. The so written letters are separated by one or arbitrary more pairs of '00', and this unary sequence is terminated by a header and trailer both marked as one bit-pair of '11'. The string might contain empty letters, in the form: 110000 . . . 11 were the '00' contain zero bit pairs of the form '01' or '10'. The number of added '00' pairs and '11' pairs is adjusted to (i) write the plaintext as a string of desired bit count L, where L can be any desired value above a certain minimum, and (ii) write the plaintext as a string of a desired ratio between ones and zeros. This unary written plaintext, $P \rightarrow P^u$, is then transposed into the respective ciphertext, C, as described in the Equivoe-T patent (application Ser. No. 14/714,328), using a selected integer K as the transposition key. We consider P' P written in the unary fashion as described above. Let L' be the length of P' so built. Any such $P^{u}$ will be a possible plaintext candidate for C because one could add to $P^{u}$ sufficient pairs of '00' and '11' so that $P^{u}$ is written as $P^{u}$ of length L'', such that $P^{u}$ and $P^u$ are of the same length (same bit count), L=L'', and both have 0.5L of zeroes and the same number of ones. Hence both $P^{u}$ and $P^u$ are equally viable plaintext candidates, because both may be associated with an Equivoe-T key, (K, and K'') that would transpose each into C. And hence no further inferential processing of C will resolve the equivocation between P and any such P'. The number of plaintext candidates qualifying as P' is very large, and hence while Equivoe-TU does not rise to the level of a Vernam cipher it does come arbitrarily close.
Re-Use of the Transposition Key While the near perfect equivocation applies to one time use of the transposition key, this equivocation is fast reduced upon reuse of same key. We now describe a strategy to maintain a high degree of equivocation while using the same transposition key. The strategy calls for parceling successive plaintexts to smaller and smaller sections, while padding each section with more and more pairs of '00' and '11' so that the length of the unary written plaintext is ever larger while the plaintext content it captures is ever smaller. The more '00' and '11' bit pairs that are injected into the unary written plaintext, the greater the equivocation.

The user of Equivoe-TU using this strategy will pay with ever larger ciphertexts to be sent out, (for smaller and smaller plaintexts) but will buy a desired level of equivocation. This strategy can continue indefinitely, or until the parties have a chance to use a different Equivoe-TU key.
Nooance Implementation Procedure (U.S. patent Ser. No. 10/395,053)

Let P be a private data belonging to a given consumer, and safeguarded by a merchant, a bank or some other institution trusted with the private data of many individuals. Let P written in the Nooance way. Nooance is the name used to express the method of writing data described in U.S. patent Ser. No. 10/395,053. Accordingly P includes n pairs of bits, such that each pair is either '01' or '10'. The choice of identity does not change the reading of P. So if P is a social security number like 340-87-9888 then it will read the same regardless of the specific identity of each of the n pairs of bits.

We use the term 'server' to indicate the bank, the merchant, or the institution that holds the private data of individuals registered with it.

Basic Procedure:

1. Using a quality randomness source, the server will write all customers data such that the identity of each of the n bit pairs will be selected at random. The so selected way to write P will be designated as $P_0$.

2. $P_0$ will be communicated to the customer who owns P.

3. The server will store $P_0$ on an off-line computer.

4. The server will randomly select an integer m where $0 < m \leq n$.

5. For every $P_0$, the server will randomly flip m bit pairs, and so generate $P_m$ 6. $P_m$ will be written in the database managed by the server to handle remote access of the customers.

7. When a customer requests access to the server, he or she forwards $P_0$ given to them by the server as a means to identity themselves. The server first reads the data carried by $P_0$, (the payload), if it is not what is expected then the request is denied. If the data read is what is expected then the server checks $P_0$ against $P_m$. If the Hamming distance between them is m ($H(P_0, P_m)=m$) then the request is honored. If the hamming distance is zero, ($H(P_0, P_m)=0$), then the server concludes that it had been hacked. If the Hamming distance is not m but close to n/2 then the server concludes that a hacker tried to guess $P_0$, and rejects the request, and also, optionally tries to trace the requestor.

Server Refreshment Procedure

8. The server selects a refreshment period, $T_r$, (may be a few days, weeks, or months long) at which time. The basic procedure is repeated from step 4 to 8. Namely a different m value will be selected, say $m' \neq m$, and the server will generate $P'_m \neq P_m$, and will then validate a customer access request only if the Hamming distance between the requested data and the server stored data is m'. $\{H(P_0, P'_m)=m'\}$. If that Hamming distance is either zero or m then the server should consider the likely possibility of being compromised.

Note: step 8 is taken in order to frustrate a hacker aware of Nooance and managed to compromised $P_m$ and the value of m. Such a hacker will be able to flip m bits in $P_m$, and pass the Nooance test. Alas, when the server data is changed from $P_m$ to $P'_m$, then the hacker will be caught, unless the hacker manages to steal the new server data ($P'_m$). Even if the hacker somehow knows the value of m' he cannot change $P_m$ to a fake $P_0$ by flipping (m−m') bit pairs because the hacker does not know which bit was flipped and which not. This defense is stronger the closer the values of m, m', m'', etc. are to n/2.

Payload Replacement Procedure.

9. In the event that the customer's data was compromised then $P_0$ may have to be replaced, and the corresponding value in the server will have to be replaced. This replacement will take place without changing the payload, the readable data. So the server can give a customer his social security number, re-written the Nooance way, without having to change the number itself.

Note: a server may choose to use the same m for all or for a large group of customers, or it may choose to give a different m value for each customer.

BitMint Veil: Protecting Unencrypted Documents from Online Spying

Keeping Clear Text and Throwing Off Content-Inferring Algorithms

Your Google traffic, your emails, your stored documents are all routinely scanned by content-inferring algorithms whether for good or for nefarious purposes—assailing your privacy all the same. Encrypting a text document is an effective way to conceal its content, but the resultant ciphertext cannot be analyzed, categorized, nor sorted. Also cryptograms serve as hiding places for malware. There is a great advantage to keeping your content in the clear and with textual integrity. Which is what BitMint Veil does. Your text gets mixed with decoys: textual words and phrases that obfuscate the original meaning and message in the pre-mixed text. The intended reader will discard the 'chaff', and focus on the 'grain'. The electronic spy (or human spy) will either concede confusion, or worse, will draw a false conclusion, and ill-interpret the analyzed document. The BitMint Veil output is effective against quantum-computing and advanced math attack (It is based on the Equivoe-T™ technology that guarantees terminal equivocation, U.S. patent Ser. No. 14/714,328). The protected clear text is subject to various scanning, sorting and aggregation. The Veil is fitted into the user's document handling system, and operates in the background. The document generating user is writing it normally. The document stores in a Veiled format, in which it is also transported, and stored on the reader's computer. The intended reader machine is loaded with the Unveiling key, so that when the text is sent to the screen or to the printer, it comes forth "clean" just the original text, without the decoys. As more and more uninvited players take a peek at our online text, the need for the Veil is becoming more pronounced.

Introduction

Unencrypted textual Internet traffic is routinely scanned and analyzed for good or nefarious purposes, violating public privacy on a wholesale basis. Merchants and their agents hunt for good prospects. Intelligence services on their part, scan textual traffic to spot threat. Polls show that about half the surfers accept it as inevitable and rather harmless, but the other half has few options to resist this onslaught. Real secret stuff is nominally encrypted, but this is a burden too much for most of the communication under consideration. Encryption is usually applied to data in transit, not to data at rest. For one reason, data owners have a vested interest in sorting and cataloging their ever increasing data volumes. This cannot be done for data in encrypted form. Most users trust the security they operate under and see it as acceptable to have their data spread naked within their protected domain. Also, encrypted data is a perfect hiding spot for worms and other malware.

Recent literature is alarming: the majority of cyber space residents have their text traffic routinely scanned. The aggregate of these scanned, processed by the ever advancing algorithms of Big Data generate a frightfully accurate profile of the writer of the analyzed text. These algorithms appear to know more than family, friends, pysyhciatrists, and the subject himself or herself. As Francis Bacon observed "Knowledge is Power". The party that knows so much about us, controls us.

In thinking about remedy, many natural options turn out as impractical. We can't stay off cyber space, and we can't be choked by encryption everywhere. One viable option is to 'throw off' those algorithmic scanners and analyzers. How? By feeding them with false input. This will lead to erroneous conclusions. The integrity of the products of these algorithms will be harmed, and their impact will crumble. The saying of the old days in computers is "garbage in, garbage out". If we manage to fool the content analyzer with misleading content then we will send a Trojan horse into its processing machinery and contaminate and erode its output.

The challenge, thus, is to add so called 'decoy information' to the true information, to be regarded as the 'payload' in ways that will on one hand (i) allow the intended reader of these documents to distinguish between the payload and the decoy, and, on the other hand (ii) fool the algorithmic content analyzers to regard the decoy on par with the payload.

This presentation here describes such a means. The Bit-Mint/Veil is way to add effective decoy to payload so that the scanning algorithm is fooled and the intended reader is not.

The Principles of the Veil Solution

Textual analysis is focused on words according to their rarity of use. The simple ones simply list words according to their rarity. The more sophisticated analyzers discern syntax and grammar associated with these rare words. Say then that to fool the simple analyzers one will need to mix with the proper (payload) rare words, decoy rare words. And for the more sophisticated analyzers the solution (the Veil) will have to put forth decoy syntax and grammar.

So the first part of the solution, the Veil, is to use the very same knowledge base utilized by the analyzers to propose effective decoys to confuse those analyzers. If the payload indicate the term "fuse" for example, and somewhere down the text it states 'bomb', then the decoy will state "home safety power fuse" to make it unclear which type of fuse is being discussed. The more effective and the more numerous the decoy terms, the greater obfuscation is achieved, denying the analyzer an accurate reading of the content of the text.

The question then is how to let the intended reader distinguish between the decoy and the payload. The Veil does it through a newly patented technology that assures 'complete transposition'. The principle is as follows. Let P, the payload comprised of words $p_1, p_2, \ldots p_n$. P is written as usual then terminated with a 'payload marker' or simply a marker. The marker is a text symbol μ which is not used in P. Based on the identity of the n P words, $p_1, p_2, \ldots p_n$, a 'decoy builder' is suggesting m decoy terms $d_1, d_2, \ldots d_m$. These terms are placed in some order after the payload marker μ, resulting in a 'transposition ready' sequence, U: U=$p_1, p_2, \ldots, p_n$, μ, $d_1, d_2 \ldots d_m$.

The sequence U is comprised of n+m+1 words. The basic Veil operation now applies: U is transposed to one of the possible (n+m+1)! sequences, to be regarded as V. U→V. The transposition is carried out using a key, K, known to the writer of the text and to the intended reader of the text. Otherwise it is secret.

The text which started with the payload, P is now stored, and if needed transported in the veiled form, V. Any intended reader of V will readily reverse-transpose V to U (V→U), then ignore the D (right of the marker μ), and focus on the payload P (left of the marker μ).

By contrast any unintended reader, not having possession of the transposition key, K, will hold the veiled version, V, and will regard each of the possible (n+m+1)! permutations of V as equally likely. This implies that the non-intended reader will be unable to distinguish between the payload and the decoy. And so, to the extent that the decoy is well derived, so the unintended reader is well confused as to the content of analyzed message.

Note that this thesis will work only if the transposition algorithm used is such that upon the prospect of its reversal every possible permutation is equally likely. The Equivoe-T algorithm (U.S. patent application Ser. No. 14/714,328) assures that, and serves as the foundation for the Veil.

The Veil Described

The Veil system takes in any body of text for which one seeks protection against algorithmic content analyzers, (the payload), and generates a 'content-veiled' version of it. This content-veiled version is considered safe for exposure to adversarial and unfriendly readers. The intended readers of the original (protected) content, (the payload) will activate the unveiling element in the Veil and be presented with the clear payload.

The Veil system is comprised of (i) the Decoy Builder, (ii) the Veiler, (iii) the Unveiler, (iv) the Key handler, and a (v) Veil manager routine. The Veil operates as stand alone or in conjunction with the word processing, email, and document handlers of its users.

The Veil operates on the payload, combines it with the decoys, into an Unveiled sequence U, then generates the veiled sequence, V. The Veil then responds to an authorized reader of V by reversing V→P (The Unveiler)

The Veil may be fitted into the user's document handling system, and it will operate in the background. The document generating user is writing it normally. The document stores in a Veiled format, in which it is also transported, and stored on the reader's computer. The intended reader machine is loaded with the Unveiling key, so that when the text is sent to the screen or to the printer, it comes forth "clean" just the original text, without the decoys.

The Veil is open-ended, in as much as it can be applied more and more extensively, hiding the content better and better by simply increasing the size of the decoy series. On the other hand the greater the decoy list, the more computation is required, and the greater the imposed delay. The better the quality of the decoys the smaller the size of the decoy list to achieve the same results.

Configuration

The Veil can operate (i) on a stand alone basis, (ii) as a hook-up to an existing document handling package, or (iii) in series with an existing document handling package.

In stand alone mode the document writing and document reading are handled within the Veil environment. The Veiled version is then released through the Internet, databases, computer folders etc. It is then fed into a Veil reader that extracts the payload (the original text) for consumption.

In the hook-up mode the writer uses the prevailing word processor to generate the document, then activates the Veil as an option on the word processor, and the Veiled version is generated and stored. When re-invoked by the word processor, the word processor first sends the Veiled version to the Veil to be unveiled and winnowed, so that only the payload is brought forth for either just reading or for further word-processing. If changed, then on its way to storage the document passes through the Veil for new veiling.

In the "in series" mode, the user generates a normal output from his or her word processor. That normal output is then being processed by the Veil and a veiled version generated. The veiled version is then released for open storage and transportation over the Internet. On the reading side the veiled version is taken in by the Unveiler, the payload is extracted, stored, ready to be word-processed.

The Decoys Builder

The decoy builder may be of various levels of sophistication. It may be (i) 'other' mode, (ii) 'word' mode, (iii) semantic mode, (iv) situational mode, and (v) analysis mode.

In the 'other' mode completely different q messages are added through the decoys. The resultant equivocation will be between the payload message and the added q ones. The larger the value of q, the greater the equivocation—confusion. Alas, if the q messages have a lower a-priori chance compared to the payload, then the effect will be much reduced. The decoy builder in that case should have situational awareness to realize which message has which likelihood to be the payload.

In 'words' mode, critical words lead to meaning-based alternatives. So a 'table' will lead to 'chair', 'door', 'cupboard'. Names will lead to decoy name. If the payload mentions George, the decoy will mention Jeff and Mary, etc.

In the semantic mode, the semantic message of the payload will be contrasted with an alternative message that is equally likely (more or less) but contradict or is vastly different from the payload message.

In the situational mode the decoy builder will be aware of the relatively few likely messages that could have been captured in the payload, and then add some or all of these messages to maximize the attacker's confusion.

In the analysis mode the decoys are selected so that the veiled version will be ready for purposeful analysis and database queries. The veiled version does include the entire content of the unveiled version, and hence the veiled version may be fit for database search and queries. This can be done by limiting the decoys to information items not needed for the expected particular analyses and queries, and by allowing for flexibility as to the definition of a transposed unit. In particular instead of dividing a sentence or paragraph to all its words, it can be divided to words and phrases that would remain intact in the veiling operation and hence properly project their information to a query.

For example if age distribution is an aim of a particular analysis of the data then the phrase 'Age 26' will be cemented into a single transposition unit. So the sentence:
John, age 26, graduated from Harvard, and resides in Boston
    will be marked as:
John, [~age 26~], graduated from Harvard, and resides in Boston
    to indicate that the 'age 26' will not be regarded as two words that can be transposed independently but rather one unit. So this payload may come out from the decoy builder as:
John, [~age 26~], graduated from Harvard, and resides in Boston &&6R&& Yale Chicago Jerry Nancy
    where the marker &&6R&& indicates that 6 ghosts will be used all lumped right of the pre-transported version (see Equivoe-T patent):
John, [~age 26~], graduated from Harvard, and resides in Boston &&6R&& Yale Chicago Jerry Nancy * * * * * *
    will be veiled to become:
Nancy from resides Jerry and Boston John, Yale, Chicago [~age 26~], graduated in &&6R&& Harvard,
    So that analytic software reading the veiled record will not know whether the payload talks about John, Jerry or Nancy; will not know if the subject graduated from Harvard, or Yale, but will know that his or her age was 26.

If later on there will be a need to analyze people according to which university they graduated from then the payload will be processed through a different decoy builder. It will be defined as:
John, age 26, [~graduated from Harvard~], and resides in Boston and will be decoy built into:
John, age 26, [~graduated from Harvard~], and resides in Boston &&3L&& Mary Tom Fred 34 55 42 21
    The sequence &&3L&& indicates the use of 3 ghosts left of message. The pre-transposition sequence will look like:
* * * John, age 26, [~graduated from Harvard~], and resides in Boston &&3L&& Mary Tom Fred 34 55 42 21
    And the veiled version:
Mary 34, resides 55 &&3L&& John, age Fred 26, [~graduated from Harvard~], and in 21 Boston Tom 42
    so that an analyst will not know if the subject is John or Mary or Fred or Tom, will not know their age but will know that they graduated from Harvard.

A combination of locked phrases is also possible:
John, [~age 26~], [~graduated from Harvard~], and resides in Boston &&3R&& Mary Tom Fred 34 55 42 21 where the analyst will know that the unknown subject graduated from Harvard and is age 26.

Illustration

Let the payload be:
John Loves Lucy
    An 'other' mode decoy will be:
John Loves Lucy &&4R&& It rains in Spain
    word mode decoy will look like:
John Loves Lucy &&4R&& George fears Nancy
    A semantic decoy will look like:
John Loves Lucy &&4R&& Ted Adores Susan
    A situational mode decoy will look like:

John Loves Lucy &&4R&& His Wife, Never loved because the decoy builder will know that the adversarial analyst wishes to know whether John loves Lucy rather than his wife.

The Veiler

The veiler uses the Equivoe-T algorithm. It may use the marker to specify (i) the counting direction pattern, and (ii) the ghost pattern. These choices may be arbitrary and randomized on the part of the Veiler, and they will be communicated to the intended reader (the intended unveiler) through the content of the marker between the payload and decoy. The basic key (the remover) will not be shared inside the marker.

For example a marker: &&f801L&&

The '&&' will mark the beginning and the end of the marker. The first two characters 'f8' indicate a hexadecimal count of ghosts. The symbol '01' indicates switching of counting direction after every removal of a transposed item. The symbol 'L' states that all the ghosts should be lined up left to the unveiled sequence.

Operation

The Veil can be operated in various environments: stand-alone or embedded. In the latter environment the veiling is an element in a larger security procedure, like subsequent encryption of the veiled file.

Stand-alone operation may be operated within an email environment.

Email Veiling

Below one's signature one will have a line stating:
Do you wish to establish a veiled email channel between us?

If a recipient is clicking on this line, he is directed to a website that explains the Veil, and offers to establish a private communication session between the person in whose email the above line was written, and the responder. This private session will allow the two to exchange a secret Equivoe-T key, which will be used by their respective mail clients to establish a veiled channel. The established veiled channel will operate 'under the users' so the two corresponding parties will keep writing and reading normally, while the messages they send each other are properly veiled, stored and communicated in a veiled form.

Veil Design Considerations

The Veil is an extra burden, which should be justified by its utility. How then to measure the Veil utility? One way is by monitoring actual results. Which indeed should happen and be used to upgrade and improve the product. Another way is through a theoretical review. Such review starts with the set S of possible selections for the content of P. S is comprised oft selections $s_1, s_2, \ldots s_t$, each of which, i, has a chance $c_i$ to be P. Obviously: $\Sigma c_i = 1$. We may organize the t options in some order on a horizontal axis, where the vertical axis is the chance for each selection to be congruent with the payload, P. The resultant function (curve) has a distinct shape when drawn by one ignorant of P, we call this probability function $f_o$. One who can read P knows for sure which of the t selection is represented by it. So, this so called the terminal function $t_f$ is similar to a delta function—a sharp spike. One who holds the veiled version of the document, faces the veiled function G. The gap between $f_0$ and $f_v$ reflects the utility of the Veil operation. The smaller that gap, the greater the utility of the Veil. There are several known statistical ways to measure difference between two curves, any one of them could be arbitrarily chosen to appraise utility.

We can reasonably claim that the utility of the Veil depends (i) on the quality of the decoys, and (ii) on the number of decoys relative to the size of the payload. The higher the quality of the decoys, the fewer decoy units are needed. The fewer decoys used, the easier the computation and faster, and the smaller the storage area.

An important design factor is scale.

Scale

The nominal scale for the Veil is sentences for payload, and words as decoy units. But it is also possible to use paragraphs as payload, and decoys of either words or phrases. The computational load depends on how many transposed units there are, not on their size or nature.

The effort to transpose a list is exponentially rising with the size of the list, which suggests preferences to small payloads. A large document will therefore be cut into small units, like sentences, and each sentence54t will be independently veiled.

Security

The security of the Veil operation depends on the quality and the count of decoys. It also depends on the security of the Equivoe-T transposer.

If only one payload is veiled then the veiled version cannot be cracked to dig out the payload because Equivoe-T is a complete transposition cipher, namely that given the veiled data, all the possible permutations may qualify as input, as pre-transposition version. So if the decoys have some threshold of confusion this full threshold is maintained for the veiled version. However if two or more payloads are veiled with the same Equivoe-T key, then only a key, K that would fit for a plausible payload candidate for both cases will be the sought after key. The more payload units that are processed with the same key the fewer key options there are, and security of Equivoe-T deteriorates.

Even if the mathematical security projected by a single payload is increasingly lost, the remaining intractability will do for most cases. When roaming algorithms try to crack meaning from text, they do so without special focus on one particular document or one particular author. So once encountering difficulties, those roaming algorithms will hop elsewhere. Of course, the security of the applied Veil must match the perceived threat from content-inferring algorithms.

One way to increase the security of the Veil is to apply a variant ghost layout.

Variant Ghost Layout

Nominally the Equivoe-T procedure operates on a fixed pre-agreed ghost layout, and on a fixed direction of counting (left to right). It is possible though to introduce an infinite variety into the ghost layout and $2^u$ variability into the counting direction of the unveiled sequence (where u is the size of the unveiled sequence).

When it comes to ghosts it is possible to per case determine a new number of ghosts and a new spread rule for the ghosts throughout the unveiled sequence.

Extended Veil

The Veil described herein is focused on veiling text. Yet, the principles of the Veil may be applied to different forms of information: graphics, images, video, as well as sound. Each of these forms of information may give rise to a suitable decoy. The set of decoy elements will then create the pre-transposition sequence, U.

For example a detailed engineering drawings of pipelines, valves, controls, flow lines, may give rise to a decoy where the lines are hooked differently, the valves are placed in different locations, and other details are also set in a reasonable, yet misleading way. The decoy drawing will be placed after the payload-decoy marker, and will be ignored by the intended reader, while the adversarial reader will be unable to properly un-mix the transposed sequence, V, and hence will not be able to conclude which is the valid drawing and which the decoy.

BitMint Off-Mint Transaction Tracker

Closed Community Means to Facilitate Efficient BitMint Digital Money Transaction BitMint digital coins transactions are authenticated three ways: (i) Mint authentication, (ii) Blockchain, (iii) iBitMint—insurance authorization. A 4th way is introduced: a transaction tracker well managed database that keeps up-to-date as to ownership of BitMint digital coins, but unlike the BitMint mint, does not hold the payload of the BitMint coins—namely the transaction tracker tracks transactions by coin id, not by coin value. Transaction Trackers may bridge over. So while the BitMint mint is singular, the array of transaction trackers may be of any count and any size. It may be local and less congested than the mint. The tracker serves as a fourth means to get BitMint transactions moving forward.

Introduction

Payment of digital currency is inherently overshadowed by the risk of double spending. The traditional way to protect against it, is a central transaction authentication entity that verifies real time all transactions. We see this in card payment and in BitMint. This central solution is inherently vulnerable to communication interruptions, jamming and network failing. If there is no alternative then a network failure will stop all respective digital transactions. While hopefully a total failure is quite infrequent, network jamming is more of an ordinary problem, and in that case the central authenticator solution will slow down payment flow in proportion to the de facto network jamming.

To alleviate this situation, a most notorious solution was published in 2009: Bitcoin. The central authenticator is replaced through many copies of a general ledger that tracks all transactions without identifying the identities of the transacting entities. It too depends on the network functionality. It also has a hoard of other problems which keep bitcoin and its imitators in the 'in doubt' category in terms of a universal digital money payment system.

The centralized money solution which is dependent on a central real life transaction authenticator, can be helped through the iBitMint solution in which insurance principles operate (i) through live insurance center authorizing transactions in real time and (ii) through pre-issued trustworthiness certificate issue to traders to present to their payees and get their transaction approved. The first mode implies an alternative means for real time authentication or authorization of a transaction. The payee may simultaneously signal the mint and the iBitMint insurer and accept the transaction on whoever is first to Ok it.

Here we propose a third option: a BitMint Transaction Tracker.

Description of the Tracker

The tracker is based on a coin status database that refer to a well defined community of traders, each of which is registered with the tracker. The database lists all the coins traded by the community, and specifies their current status, namely identifies their current owner. The BitMint money solution separates between the payload of a coin (the money itself) and the 'capsule' of the coin, namely all the data, the id, the terms except the money itself. The tracker database holds only the capsule data, not the payload. So hacking the tracker database does not yield money, only information. The database is accessed only through the database manager. When a payer trader pays BitMint digital money to payee trader, then either one of them, or the two of them report to the manager. The manager verifies that the paid coin is registered to the payer, and then switches its registration to the payee, so the status is being updated real time.

When a registered trader buys a new coin from the BitMint mint then she registers this coin with the tracker manager. When a trader redeems a coin, the mint check with the manager that it is current owner of that coin, and the coin is removed from the database.

Since the community of traders served by the tracker is a subset of the larger trader community, there is a risk that a registered trader having a coin registered to himself, will pay that coin to a non registered trader, all the while will remain listed as the owner of the coin that is already someone's else. But on account of this registration the database will OK paying same coin to another registered trader and then to another and so on, all the while the coin is traded outside the community. The registered traders trade with a no-coin but are not aware of it. It is therefore important for the BitMint mint to issue coins authorized for trade only within the registered community. So a registered trader cannot pay that coin outside the community. Should a trader wish to pay the coin outside the registered community then she will have to first redeem the community coin—and the coin will be dropped from the live database, and buy instead a generic BitMint coin which then the trader can pay anywhere to anyone.

The advantage of this tracking database is that it may be local and with better communication channel to the registered traders so that on occasions when the mint or the insurer cannot be timely reached the tracker database will insure the traders that the transaction is bona fide. It is simply another option to overcome the inherent risk of double spending.

Tracking database communities may be several within the larger community of the traders for the same BitMint mint. These communities may be linked, to allow traders from one community to trade with another.

The Transaction Tracker keeps tracks of the movements of money within the community of registered members. It will record a transaction only if both payer and payee OK it.

It will not have the money, only the coin capsules. The Mint will not redeem a coin without clearing with the Tracker that the redeemer is the current owner of that coin, and once redeemed the coin will be taken off the Tracker's list.

What is claimed is:

1. A method of implementing Live Documentation (LiDo) systems to incorporate and authenticate metadata of electronic documents, wherein the method comprises:
    performing the following steps by one or more software packages of a first LiDo system executing on a first computing device:
        receiving an electronic document and partitioning the electronic document into one or more textual units, wherein each textual unit corresponds to metadata, wherein each textual unit of the one or more textual units comprises a payload including a printable message made up of a word, phrase, sentence, or one or more paragraphs of text which a consumer of the first computing device can view and print;
        wherein the metadata is not visible to the consumer and includes one or more attributes for each textual unit as specified by the range of the document metadata zone, wherein each textual unit comprises one or more attributes including: an identifier of the writer for each textual unit, a time of birth of each textual unit and a signature to authenticate the metadata corresponding to of each textual unit;
        receiving a request from the consumer including Terms of Display (ToD) for a specified payload from the electronic document, wherein the ToD specify displaying or printing the specified payload according to one or more attributes of the metadata;
        upon determining that the consumer is authorized as the writer of the specified payload, display the electronic document for the consumer and permit the consumer to generate a signature for the textual unit of the specified payload by signing the specified payload with a private key of the consumer, wherein the signature includes the time of birth of the textual unit;
        receive from the consumer a level of validity which the consumer assigns to the printable message of the specified payload;
        storing, by the first LiDo system, the level of validity and the signature generated by the consumer as part of the one of the more attributes for the textual unit of the specified payload;
    performing the following steps by one or more software packages of a second LiDo system executing on a second computing device:
        receiving a request from a second consumer including ToD for the specified payload from the electronic document;
        displaying the electronic document and specified payload on the second computing device according to the ToD;
        receiving a request from the second consumer to validate the authenticity of the specified payload;
        obtaining a public key corresponding to the writer of the specified payload;
        validating the authenticity of the specified payload upon successfully decrypting the signature of the specified payload using the public key of the writer;
        receiving a request from the second consumer to filter the printable messages of the electronic document so that only printable messages corresponding to textual units with a level of validity above a designated threshold are displayed; and displaying the printable message corresponding to the specified payload when determining that the level of validity assigned to the printable message of the specified payload is above the designated threshold requested by the second consumer.

2. The method of claim 1, wherein the method further includes:

receiving a request to delete a specific textual unit from the one or more textual units, wherein the request to delete causes the first LiDo system to set a death time attribute for the specific textual unit as corresponding to the time at which the specific textual unit is deleted, wherein the one or more attributes include a death time for each textual unit of the electronic document, wherein the time of birth is generated by the first LiDo system when the electronic document is created and the death time is set as undetermined until such time that the consumer requests for the textual unit to be deleted;

receiving a request to display the specific textual unit after the deletion request has been granted, wherein the request to display the specific textual unit specifies a time of an earlier version of the specific textual version which is prior to the death time of the specific textual unit; and granting the request to display the earlier version of the specific textual unit upon determining that the time of the requested earlier version is also after the time of birth for the birth time attribute of the specific textual unit.

3. The method of claim 1, wherein the one or more attributes each textual unit comprises further includes:

an attribute of the metadata comprising a translation of the printable message from the language of the printable message into a foreign language.

4. The method of claim 1, where the payload of each of the textual units is written with an alphabet AB comprised of $2^t$ letters, where t is a positive integer, and where a letter i is an index in AB referring to a letter from AB, where i=1, 2, . . . $2^t$ and is written as concatenated $\beta+i$ pairs of bits, where $\beta$ is a non-negative integer, and the pairs of bits are either '01' or '10', and where the choice of pair identity does not impact the value of the written letter, i, and where the metadata for each textual unit is written via selection of a particular combination of bit pair identities, so that when each textual unit has m such bit pairs, there are 2m possible such combinations with which to specify the metadata for each textual unit, and where between any two letters so written, there is a '00' pair of bits to mark where one letter ends and the other begins, and where each textual unit is bounded by a header and a trailer both in the form of a bit pair '11', and wherein the electronic document begins with a string of '111111' followed by an administrative metadata zone, and where the metadata zone is terminated with a string '111111' followed by a sequence of textual units of the electronic document, wherein the sequence of textual units comprises the payloads and corresponding metadata of each of the textual units, which are followed by a string of '111111' which bounds the electronic document.

5. The method of claim 1, wherein the consumer may be one or more of the following: a user requesting to read, view or print the electronic document, the writer of the electronic document or an editor of the electronic document.

\* \* \* \* \*